United States Patent
Aastuen et al.

(10) Patent No.: US 6,672,721 B2
(45) Date of Patent: Jan. 6, 2004

(54) PROJECTION SYSTEM HAVING LOW ASTIGMATISM

(75) Inventors: David J. W. Aastuen, Farmington, MN (US); Charles L. Bruzzone, Woodbury, MN (US); Stephen K. Eckhardt, Austin, TX (US); Jiaying Ma, Maplewood, MN (US)

(73) Assignee: 3M Innovative Properties Company, St. Paul, MN (US)

( * ) Notice: Subject to any disclaimer, the term of this patent is extended or adjusted under 35 U.S.C. 154(b) by 0 days.

(21) Appl. No.: 09/878,559

(22) Filed: Jun. 11, 2001

(65) Prior Publication Data

US 2003/0038923 A1 Feb. 27, 2003

(51) Int. Cl.[7] ......................... G03B 21/00; G03B 21/14; G03B 21/28
(52) U.S. Cl. ..................... 353/31; 353/33; 353/20; 353/81
(58) Field of Search .................... 353/31, 33, 22, 353/20, 81

(56) References Cited

U.S. PATENT DOCUMENTS

| | | | | |
|---|---|---|---|---|
| 4,943,155 A | * | 7/1990 | Cross, Jr. ..................... 353/33 |
| 5,428,417 A | * | 6/1995 | Lichtenstein ................ 353/122 |
| 5,808,798 A | | 9/1998 | Weber et al. |
| 5,882,774 A | | 3/1999 | Jonza et al. ................. 428/212 |
| 5,946,054 A | * | 8/1999 | Sannohe et al. ............ 348/745 |
| 5,962,114 A | * | 10/1999 | Jonza et al. ................. 359/494 |
| 5,965,247 A | | 10/1999 | Jonza et al. ................. 428/212 |
| 6,062,694 A | * | 5/2000 | Oikawa et al. ............... 353/31 |
| 6,188,529 B1 | * | 2/2001 | Koyama et al. ............... 353/37 |
| 6,250,763 B1 | * | 6/2001 | Fielding et al. ................ 353/33 |
| 6,362,922 B2 | * | 3/2002 | Tadic-Galeb et al. ........ 359/618 |
| 6,364,489 B1 | * | 4/2002 | Eguchi ....................... 353/122 |

FOREIGN PATENT DOCUMENTS

| | | |
|---|---|---|
| EP | 1 072 935 | 1/2001 |
| JP | 07113904 | 5/1995 |
| JP | 07294918 | 11/1995 |
| JP | 08297203 | 11/1996 |
| JP | 08334620 | 12/1996 |
| JP | 11249076 | 9/1999 |
| WO | WO01/26384 | 4/2001 |

OTHER PUBLICATIONS

U.S. patent application Ser. No. 09/312,917 by: Bruzzone et al., filed May 1999.*
U.S. patent application Ser. No. 09/746,933 by: Bruzzone et al.provisionaly filed Jan. 2000.*
U.S. patent application Ser. No. 09/312,917, Bruzzone et al., filed May 17, 1999.
U.S. patent application Ser. No. 09/878,575, Weber et al., filed Jun. 11, 2001.
U.S. patent application Ser. No. 09/746,933, Aastuen et al., filed Dec. 22, 2000.

* cited by examiner

Primary Examiner—Russell Adams
Assistant Examiner—Andrew Sever
(74) Attorney, Agent, or Firm—Bruce E. Black; Iain McIntyre

(57) ABSTRACT

Generally, the present invention relates to an apparatus for reducing astigmatism in a projection system that is particularly well suited to reducing astigmatism in LCD projection systems. A projection system includes a light source to generate light, conditioning optics to condition the light from the light source and an imaging core to impose on image on conditioned light from the conditioning optics to form image light. The imaging core includes a polarizing beamsplitter and at least one imager, and at least one element in the imaging core is adapted to reduce astigmatism in the image light. The astigmatism may arise in the polarizing beamsplitter. A projection lens system projects the astigmatism-reduced image light from the imaging core.

102 Claims, 13 Drawing Sheets

PROJECTION SYSTEM HAVING LOW ASTIGMATISM

TECHNICAL FIELD

The present invention is directed generally to systems for displaying information, and more particularly to reflective projection systems.

BACKGROUND

Optical imaging systems typically include a transmissive or a reflective imager, also referred to as a light valve or light valve array, which imposes an image on a light beam. Transmissive light valves are typically translucent and allow light to pass through. Reflective light valves, on the other hand, reflect only selected portions of the input beam to form an image. Reflective light valves provide important advantages, as controlling circuitry may be placed behind the reflective surface and more advanced integrated circuit technology becomes available when the substrate materials are not limited by their opaqueness. New potentially inexpensive and compact liquid crystal display (LCD) projector configurations may become possible by the use of reflective liquid crystal microdisplays as the imager.

Many reflective LCD imagers rotate the polarization of incident light. In other words, polarized light is either reflected by the imager with its polarization state substantially unmodified for the darkest state, or with a degree of polarization rotation imparted to provide a desired grey scale. A 90° rotation provides the brightest state in these systems. Accordingly, a polarized light beam is generally used as the input beam for reflective LCD imagers. A desirable compact arrangement includes a folded light path between a polarizing beamsplitter (PBS) and the imager, wherein the illuminating beam and the projected image reflected from the imager share the same physical space between the PBS and the imager. The PBS separates the incoming light from the polarization-rotated image light. A single imager may be used for forming a monochromatic image or a color image. Multiple imagers are typically used for forming a color image, where the illuminating light is split into multiple beams of different color. An image is imposed on each of the beams individually, which are then recombined to form a full color image.

It is desirable to use as much light generated by the light source as possible. Where the light source generates light over a wide angle, such as an arc lamp, more light can be passed through the imager system using high f-number optics. A problem, termed "polarization cascade" and associated with a conventional PBS, places a lower limit on the f-number of the illumination optics of traditional optical imaging systems. A conventional PBS used in a projector system, sometimes referred to as a MacNeille polarizer, uses a stack of inorganic dielectric films placed at Brewster's angle. Light having s-polarization is reflected, while light in the p-polarization state is transmitted through the polarizer. However, wide angle performance is difficult to achieve using these polarizers, since the Brewster angle condition for a pair of materials is strictly met at only one angle of incidence. As the angle of incidence deviates from Brewster's angle, a spectrally non-uniform leak develops. This leak becomes especially severe as the angle of incidence on the film stack becomes more normal than Brewster's angle. Furthermore, there are contrast disadvantages for a folded light path projector associated with the use of p- and s-polarization.

Since light in a projection system is generally projected as a cone, most of the rays of light are not perfectly incident on the polarizer at Brewster's angle, resulting in depolarization of the light beam. The amount of depolarization increases as the system f-number decreases, and is magnified in subsequent reflections from color selective films, for example as might be found in a color-separating prism. It is recognized that the problem of depolarization cascade effectively limits the f-number of the projection system, thereby limiting the light throughput efficiency.

There remains the need for an optical imaging system that includes truly wide-angle, fast optical components that may allow viewing or display of high-contrast images with low optical aberration.

SUMMARY OF THE INVENTION

Generally, the present invention relates to an apparatus for reducing astigmatism in a projection system that is particularly well suited to reducing astigmatism in LCD projection systems. In particular, the invention is based around an imaging core that includes astigmatism reduction in at least one of its elements, for example in the polarization beamsplitter or, where the imaging core includes imagers for two or more color bands, in the color combiner such as a color prism, an x-cube combiner or a two-color dichroic combiner.

One particular embodiment of the invention is directed to an optical device that includes a polarizing beamsplitter, a first path being defined through the polarizing beamsplitter for light in a first polarization state, and at least one imager disposed to reflect light back to the polarizing beamsplitter, portions of light received by the at least one imager being polarization rotated, polarization rotated light propagating along a second path from the imager and through the polarizing beamsplitter. An astigmatism compensating element is disposed on the second path to reduce astigmatism in the polarization rotated light caused by the polarizing beamsplitter.

Another embodiment of the invention is directed to an optical device that includes polarizing beamsplitter means for directing light in a first polarization state along a first path and for directing light, in a second polarization state orthogonal to the first polarization state, along a second path different from the first path, and light imaging means for imposing an image on light by rotating polarization of portions of the light and reflecting the light to the polarizing beamsplitter, image light propagating along the second path through the polarizing beamsplitter means. The device also includes astigmatism correcting means disposed on the second path to reduce astigmatism in the image light caused by the polarizing beamsplitter means.

Another embodiment of the invention is directed to a projection system that includes a light source to generate light, conditioning optics to condition the light from the light source and an imaging core to impose on image on conditioned light from the conditioning optics to form image light. The imaging core includes a polarizing beamsplitter and at least one imager, and at least one element in the imaging core is adapted to reduce astigmatism in the image light. A projection lens system projects the astigmatism-reduced image light from the imaging core.

The above summary of the present invention is not intended to describe each illustrated embodiment or every implementation of the present invention. The figures and the detailed description, which follow, more particularly exemplify these embodiments.

BRIEF DESCRIPTION OF THE DRAWINGS

The invention may be more completely understood in consideration of the following detailed description of various embodiments of the invention in connection with the accompanying drawings, in which.

Figure 1:
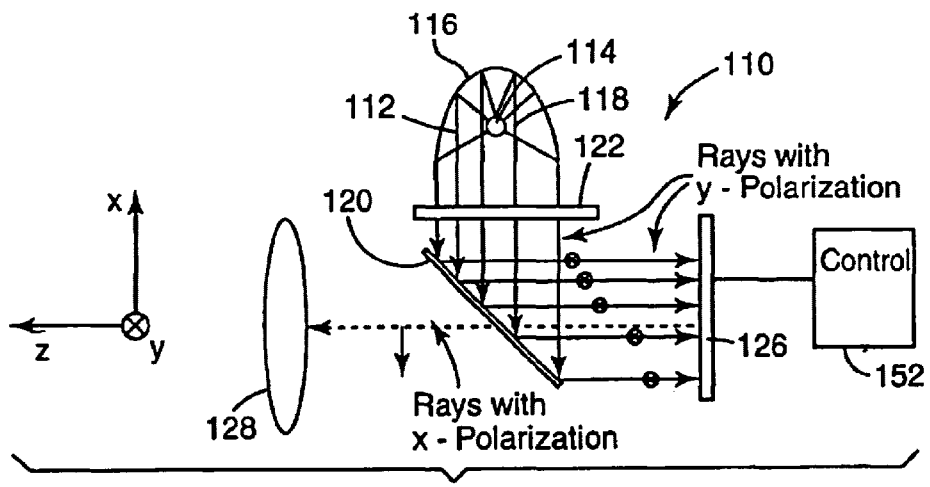
FIG. 1 schematically illustrates an embodiment of a projection unit based on a single reflective imager.

While the invention is amenable to various modifications and alternative forms, specifics thereof have been shown by way of example in the drawings and will be described in detail. It should be understood, however, that the intention is not to limit the invention to the particular embodiments described. On the contrary, the intention is to cover all modifications, equivalents, and alternatives falling within the spirit and scope of the invention as defined by the appended claims.

DETAILED DESCRIPTION

The present invention is applicable to optical imagers and is particularly applicable to low f-number optical imager systems that produce high quality, low aberration, projected images.

The term optical imager system as used herein is meant to include a wide variety of optical systems that produce an image for a viewer to view, that may be used in, for example, front and rear projection systems, projection displays, head-mounted displays, virtual viewers, heads-up displays, optical computing systems, optical correlation systems and other optical viewing and display systems.

One approach to overcoming the problem of depolarization cascade is to use a wide-angle Cartesian polarization beamsplitter (PBS), as discussed in U.S. patent application Ser. No. 09/312,917, filed on May 17, 1999, and incorporated herein by reference. A Cartesian PBS is a PBS in which the polarization of separate beams is referenced to invariant, generally orthogonal, principal axes of the PBS film. In contrast, with a non-Cartesian PBS, the polarization of the separate beams is substantially dependent on the angle of incidence of the beams on the PBS.

An example of a Cartesian PBS is a multilayer, reflective polarizing beamsplitter (MRPB) film, which is formed from alternating layers of isotropic and birefringent material. If the plane of the film is considered to be the x-y plane, and the thickness of the film is measured in the z-direction, then the z-refractive index is the refractive index in the birefringent material for light having an electric vector parallel to the z-direction. Likewise, the x-refractive index is the refractive index in the birefringent material for light having its electric vector parallel to the x-direction and the y-refractive index is the refractive index in the birefringent material for light having its electric vector parallel to the y-direction. The x-refractive index of the birefringent material is substantially the same as the refractive index of the isotropic material, whereas the y-refractive index of the birefringent material is different from that of the isotropic material. If the layer thicknesses are chosen correctly, the film reflects visible light polarized in the y-direction and transmits light polarized in the x-direction.

One example of an MRPB film is a matched z-index polarizer (MZIP) film, in which the z-refractive index of the birefringent material is substantially the same as either the x-refractive index or the y-refractive index of the birefringent material. The MZIP film has been described in U.S. Pat. Nos. 5,882,774 and 5,962,114, both of which are incorporated by reference. An improved type of MZIP film, having increased lifetime, uses PET/COPET-PCTG as the alternating layers, as is described in U.S. patent application titled "Polarizing Beam Splitter", filed on even date herewith, with 3M Attorney Docket No. 56718USA7A.002, which is incorporated by reference.

One embodiment of system 110 that uses an imager is illustrated in FIG. 1, and includes a light source 112, for example an arc lamp 114 with a reflector 116 to direct light 118 in a forward direction. The light source 112 may also be a solid state light source, such as light emitting diodes or a laser light source. The system 110 also includes a Cartesian PBS 120, for example a wire grid polarizer or an MRPB film. Light with y-polarization, polarized in a direction parallel to the y-axis, is indicated by the circled x. Light with x-polarization polarized in a direction parallel to the x-axis, is indicated by a solid arrow depicting the polarization vector. Solid lines indicate incident light, while dashed lines show light that has been returned from the imager 126 with a changed polarization state. Light, provided by the source 112, is conditioned by conditioning optics 122 before illuminating the PBS 120. The conditioning optics 122 change the characteristics of the light emitted by the source 112 to characteristic that are desired by projection system. For example, the conditioning optics 122 may alter the divergence of the light, the polarization state of the light, and the spectrum of the light. The conditioning optics 122 may include for example, one or more lenses, a polarization converter, a pre-polarizer and/or a filter to remove unwanted ultraviolet or infrared light. In some embodiments, the conditioning optics 122 may have a low f-number, for example equal to or less than 2.5, in order to use a large fraction of the light from the light source 112.

The y-polarized components of the light are reflected by the PBS 120 to the reflective imager 126. The liquid crystal mode of imager 126 may be smectic, nematic or some other suitable type of reflective imager. If the imager is smectic, the imager 126 may be a ferroelectric liquid crystal display (FLCD). The imager 126 reflects and modulates an image beam having x-polarization. The reflected x-polarized light is transmitted through the PBS 120 and is projected by the projection lens system 128, the design of which is typically optimized for each particular optical system taking into account all the components between the lens system 128 and the imager(s). A controller 152 is coupled to the imager 126 to control the operation of the imager 126. Typically, the controller 152 activates the different pixels of the imager 126 to create an image in the reflected light.

Figure 2:
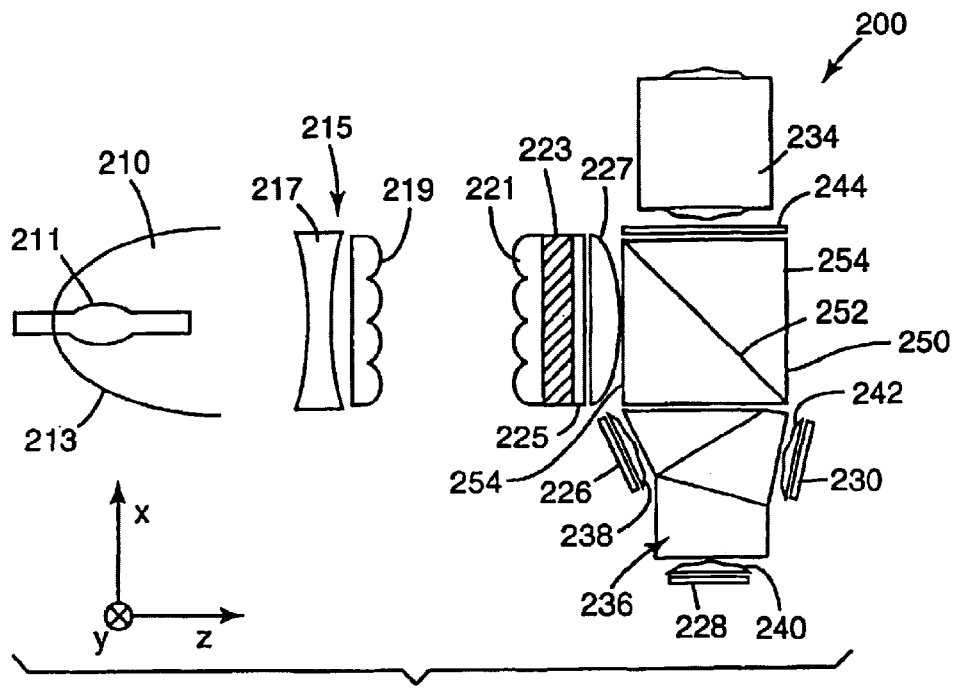
FIG. 2 schematically illustrates another embodiment of a projection unit based on multiple reflective imagers.

Another embodiment of a projection system 200 is illustrated in FIG. 2. The system uses a light source 210, such as an arc lamp 211 having a curved reflector 213, which directs light towards the illumination optics 215. In the illustrated embodiment, the conditioning optics 215 include a collimating lens 217, a first lenslet array 219, a second lenslet array 221 and a condensing lens 227. Between the second lenslet array 221 and the condensing lens 227, the conditioning optics 215 may include an optional polarization converter 223, for example of the Geffkcken-type design. Depending on the conversion efficiency of the polarization converter 223, it may be advantageous to include an optional pre-polarizer 225 following the polarization converter 223. The pair of lenslet arrays 219 and 221 receives nominally collimated light from the collimating lens 217. The polarization converter 223 and the prepolarizer 225 polarize the light incident on the PBS 250 in the desired polarization state. It will be appreciated that the illumination optics may include more or fewer optical components than those described for this particular embodiment.

The lenslet arrays 219 and 221, and the condensing lens 227, shape and homogenize the light in order to illuminate the reflective imagers 226, 228 and 230 evenly. The PBS 250 redirects the y-polarized light towards the three reflective imagers 226, 228 and 230. The PBS 250 typically includes an MRPB film 252, such as an MZIP film, that may be free standing, disposed between plates, or encased between prisms 254, as illustrated. The plates or prisms 254 may be formed from glass and may collectively be referred to as covers for the MRPB film 252.

In a multiple-imager system, a color prism 236 separates the light into separate color bands associated with each imager. For the three-imager configuration illustrated, the color prism 236 typically separates the light into primary color bands: red green and blue. Intervening lenses, such as field lenses 238, 240 and 242, may be inserted between each imager and the color prism 236 to further optimize the optical response of the system. The imagers 226, 228 and 230 modulate the polarization state of the light upon reflection to varying degrees, depending on particular image information. The color prism 236 then recombines the red, green and blue images and passes the combined image light to the Cartesian PBS 250, which analyzes the polarization state of the image by passing substantially only x-polarized light. The y-polarized light is redirected back to the light source 212. The light that passes through the PBS 250 is collected by the projection lens system 234 and may be subsequently focused to a screen (not shown) for viewing. An optional post-polarizer 244 may be inserted between the PBS 250 and the projection lens system 234. It will be appreciated that other optical configurations may be used with multiple imagers.

Figure 3A:
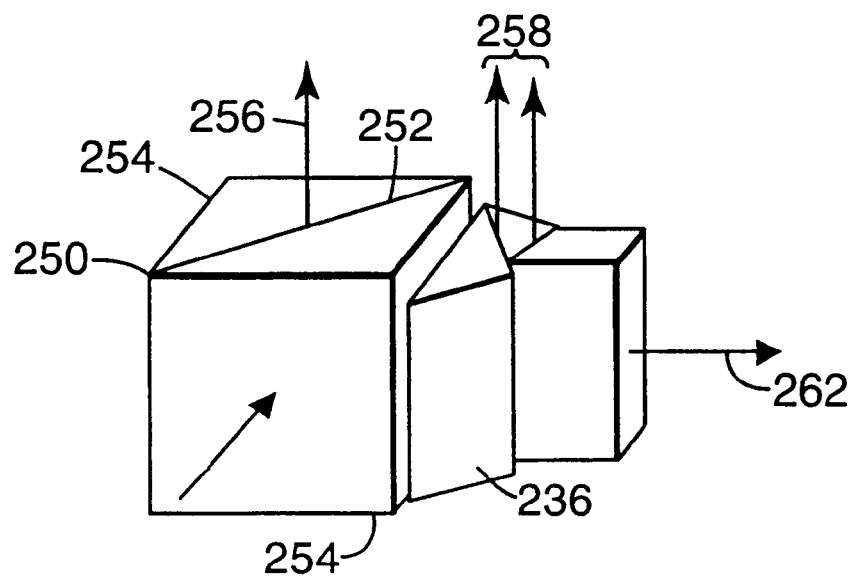
FIGS. 3A and 3B illustrates different orientations of a color prism relative to a polarizing beamsplitter.
Figure 3B:
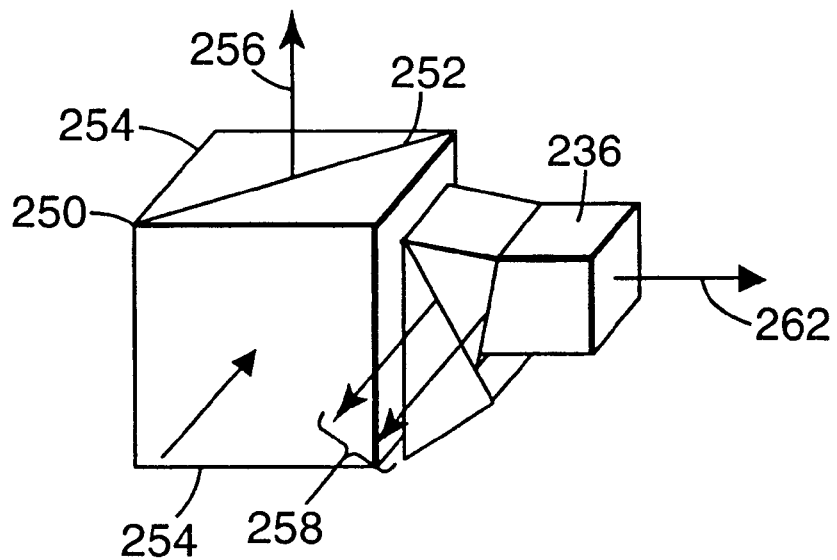

In the illustrated embodiment, the color prism 236 is a Phillips prism, such as is available from Optical Coatings Laboratory, Inc. from Santa Rosa, Calif. For purposes of clarity, the color prism 236 is shown in the conventional orientation with the rotation axes 258 of the first and second color selective surfaces parallel to the rotation axis 256 of the Cartesian PBS 250, as is illustrated in perspective view in FIG. 3A. A rotation axis is an axis about which a surface would be rotated to move from its real position to a position perpendicular to the light propagation direction. While this relative orientation between the rotation axes 258 of the color selective surfaces and the rotation axis 256 of the PBS is often necessary for conventional types of polarizer, a Cartesian PBS 250 also permits the rotation of the color prism 236 about the principle axis 262 of the beam, so that the first and second imagers 226 and 230 are oriented vertically with respect to one another, and the nominally s-polarized light from the PBS is p-polarized with respect to the color selective surfaces of the color prism 236. The rotated arrangement is illustrated in perspective view in FIG. 3B, in which the rotation axes 258 of the color selective surfaces are perpendicular to the rotation axis 256 of the PBS 250. The rotated arrangement is described in U.S. patent application Ser. No. 09/746,933, entitled "Reflective LCD Projection System Using Wide-Angle Cartesian Polarizing Beamsplitter and Color Separation and Recombination Prisms", by David J. W. Aastuen and Charles L. Bruzzone, filed on Dec. 22, 2000, and incorporated herein by reference.

The use of a Cartesian PBS 120 or 250 permits the projection system to demonstrate a dynamic range of at least 100:1 in the visible light range where the conditioning optics 215 have an f-number of 2.5 or less. Furthermore, the components between the conditioning optics 215 and the projection lens system 234, may be referred to as an imaging core. The imaging core typically includes at least a polarizing beamsplitter and one or more imagers. If more than one imager is used, the imaging core may also include color separating and combining optics, such as a color prism, dichroic separator, x-cube or the like. The imaging core does not include lenses, other than optional field lenses disposed between a color separation element and imagers. The imaging core may be telecentric, in which the cone of light incident on the imager is constant over the surface of the imager. Telecentric imager cores typically do not include field lenses.

One embodiment of Cartesian PBS 250 is an MRPB film 252, such as an MZIP film, encased between prisms 254. In order to minimize the birefringence resulting from thermally induced stresses caused by high intensity light beams, the prisms 254 are preferably formed from a material having a low stress-optic coefficient. One of the most suitable materials for this purpose is a glass marketed under the names SF57 (Schott Glass) or PBH55 (Ohara Glass). Both SF57 and PBH55 glass have a refractive index of about 1.85.

The refractive index of the MRPB film 252 is typically less than that of the surrounding prisms 254. For example, the refractive index of an MZIP film is approximately 1.56, and its thickness is typically around 125 $\mu$m. In assembling the PBS 250, the MRPB film is attached to the prism faces using approximately 50 μm thick glue with a matching refractive index of about 1.56. One particularly suitable type of glue for use with an MRPB film has been found to be Norland 61, manufactured by the Norland Corporation. Together, the PBS film 252 and the glue form an inclined plate of refractive index of about 1.56 and thickness 225 μm, lying an angle of about 45° to the propagation direction of the light. This relatively low index plate, within relatively higher index prisms 254 introduces astigmatism to the image light. Astigmatism is a problem for light that has been reflected by an imager.

The astigmatism of an inclined plate of refractive index n in a medium of refractive index n' is given by the expression:

$$A = \frac{t}{\sqrt{n^2 - n'^2\sin^2\theta}}\left[\frac{n^2\cos^2\theta}{n^2 - n'^2\sin^2\theta}\right] \quad (1)$$

where t is the thickness of the slab and θ is the angle between the central ray of the optical beam and the slab. The astigmatism is a result of the differential displacement of the sagittal and tangential beams due to passage through an inclined slab of material having a refractive index different from that of its surroundings.

The values of n and n' are wavelength dependent due to chromatic dispersion, and so the value of the astigmatism is also wavelength dependent. The wavelength dependence of the refractive indices of an MZIP film, typically comprising polyester-like films and co-polymers, and SF57 glass are provided in Tables I and II respectively.

TABLE I

Wavelength Dependence of MZIP Refractive Index

| Wavelength (nm) | Refractive index |
| --- | --- |
| 435.8 | 1.5745 |
| 480 | 1.5691 |
| 546.1 | 1.5634 |
| 589.6 | 1.5594 |
| 643.8 | 1.5562 |

TABLE II

Wavelength Dependence of SF57 Refractive Index

| Wavelength (nm) | Refractive index |
| --- | --- |
| 435.8 | 1.8939 |
| 486.1 | 1.872 |
| 546 | 1.855 |
| 587.5 | 1.8466 |
| 656 | 1.8365 |

Using expression (1), astigmatism caused by a 225 μm thick film in SF57 glass prisms is calculated for different colors to be: 169 μm for red light (645 nm), 181 μm for green light (546 nm) and 196 μm for blue light (480 nm). In many cases, it may be sufficient to correct for the astigmatism of the green light, concomitantly reducing the astigmatism of the blue and red portions of the light. The viewer will see a substantially astigmatism-free image where the astigmatism for each color band is less than the depth of field of the projection lens system. Thus perfect cancellation of the astigmatism at all wavelengths is not required. When a single value of astigmatism is provided below, it is assumed to be the value of astigmatism for green light at about 546 nm. In other approaches, the astigmatism for different color bands may be corrected separately.

A first approach to eliminating astigmatism introduced by an inclined plate of relatively low refractive index surrounded by a material of relatively high refractive index is to propagate the light through a second inclined plate that has a refractive index lower than its surrounding material and that is inclined about a rotation axis perpendicular to that of the first plate. The second inclined plate may be formed from any suitable solid, liquid or gaseous material. If the second plate is identical to the first one, in terms of refractive index and thickness, then it should be inclined at the same angle as the first plate in order to minimize the astigmatism. If the second plate is not identical to the first plate, then the magnitude of the astigmatism introduced by the second plate is preferably the same as that introduced by the first plate in order to cancel the astigmatism completely. This requires selection of angle and thickness of the plate and the refractive index difference between the second plate and its surroundings. In the designs discussed below, spherical aberration and coma are sufficiently small that they can be ignored for practical purposes. However, compensation for spherical aberration and coma may be required in an optical system, in addition to astigmatism compensation. Since the introduction of astigmatism compensation may increase other aberrations, it may be preferred partially compensate the astigmatism in order to achieve a balance among aberrations.

A second approach to eliminating astigmatism introduced by a first inclined plate having a relatively low refractive index compared to its surrounding material is to introduce a second inclined plate having a refractive index higher than the surrounding material. The second inclined plate may be formed of a solid, liquid or gaseous material. The second inclined plate is typically inclined about a rotation axis that is parallel to the rotation axis of the first inclined plate. This requires selection of the material thickness, refractive index and angle of inclination in order to provide compensation for the astigmatism. Specific embodiments using this approach to eliminate astigmatism are discussed later.

The approaches to reducing astigmatism discussed herein are applicable to projection systems having a wide range of f-numbers, and are believed to be particularly advantageous for projection systems having low f-numbers. The approaches discussed herein may be used to reduce astigmatism or to substantially correct the astigmatism. In many cases, the astigmatism need not be completely cancelled, but need only be reduced to a value less than the depth of field of the projection lens system. The depth of field typically increases with f-number, and so astigmatism correction becomes increasingly more important for low f-number projection systems. The term "substantially correct" means that the astigmatism is reduced to a value less than the depth of field of the projection lens system that is being used.

Although the discussion herein is directed to reducing astigmatism that arises in a MRPB PBS, it will be appreciated that the approaches to reducing astigmatism discussed below are also useful for reducing astigmatism that arises in other components of a projection system.

Astigmatism reduction may be introduced based on adaptation of the color prism. Referring again to FIGS. 3A and 3B, in general, when the rotation axes 258 are perpendicular to the rotation axis 256, astigmatism correction is introduced into the color prism 236 using a plate of relatively low refractive index compared to its surroundings. In contrast, when the rotation axes 258 of the color selecting surfaces are parallel to the rotation axis 256 of the PBS, astigmatism correction is introduced to the color prism using a plate of relatively high refractive index compared to its surroundings.

First we discuss a specific embodiment of the invention that uses a second inclined plate having a relatively low refractive index. Different designs of color prisms 236 are available, several of which include three or four prisms used for separating the light into two or more color bands. Often a color prism 236 separates the light into its red, green and blue components. In the Philips Prism construction, illustrated in FIG. 4, the color prism 400 is formed from three prisms 402, 404 and 406. Light 410 entering the first prism 402 is incident on the first filter 412, which reflects light in the first color band and transmits light in the second and third color bands. The light in the first color band 414 is totally internally reflected at the input surface 416 to the first prism, since there is an air gap 417 between the input surface 416 and the PBS 450, and is directed to the first imager 426.

The light transmitted into the second prism 404 is incident on the second filter 418, which reflects light 420 in the second color band and transmits light 424 in the third color band. The light 420 reflected by the second filter 418 is totally internally reflected at the gap 422, typically an air gap, between the first and second prisms 402 and 404, and is directed to the second imager 428. The light 424 transmitted through the second filter 418 is directed through the third prism 406 to the third imager 430.

Typically, the first color band is blue, the second color band is red and the third color band is green. This need not be the case, however, and the different color bands may have different colors.

The gap 422 between the first and second prisms 402 and 404 is conventionally kept small, typically in the range 10 μm to 25 μm, which is sufficient to permit total internal reflection to take place for the second color band. However, the gap 422 may be increased in size in order to provide astigmatism compensation, as is discussed further in the following example.

EXAMPLE 1

The color prism 400 was formed from low birefringence glass, PBH55, having a refractive index of 1.85. The angle of incidence of the central ray onto the air gap 422 was 21°. The first color band was blue, the second color band was red and the third color band was green. The color prism 400 was in the rotated position relative to the PBS 450, so that the nominally s-polarized light from the PBS 450 was p-polarized in the color prism 400.

The size of the air gap was adjusted to compensate for an astigmatism value of 181 μm. Before adjustment, the PBS/color prism assembly was used in a projector system that projected a pattern of horizontal and vertical lines on a screen. It was possible to focus on either the horizontal lines or vertical lines, but not both simultaneously. If, for example, the horizontal lines were focused at 178 cm distance from the projection lens, then the vertical lines were in focus at 105 cm, a focal distance ratio of 1.7:1. If the best simultaneous focus were used, then both sets of lines became significantly blurred.

To adjust the gap 422, the first and second prisms 402 and 404 were separated and then re-assembled with an air gap 422 of 100 μm using Monosized Microsphere Size Standard Beads from Duke Scientific Corp., Palo Alto, Calif., as spacers. The beads had a diameter of 100 μm.

After reassembling with the 100 μm gap 422, the astigmatism of the system was again measured for red and green light. The vertical lines focused at 135 cm whereas the horizontal lines focused at 178 cm, a focal distance ratio of 1.32:1. Furthermore, the qualitative appearance of the lines when the focus was optimized was dramatically improved from the situation where the gap 422 was 10 μm.

The gap 422 was readjusted to 140 μm by replacing the 100 μm spacer beads with 140 μm spacer beads, also from Duke Scientific. When tested for astigmatism, it was difficult to quantify the difference between the focal points of the vertical and horizontal lines. It appeared that the saggital rays were focused between 160 and 170 cm from the projector, for a focal ratio of less than 1.1:1. When re-focused to provide the best overall focus, there was no apparent blur to either the vertical or horizontal lines.

It will be appreciated that adjusting the air gap 422 does not affect the astigmatism for the light 414 in the first color band. A qualitative test was made to determine whether correction of the red and green astigmatism alone would lead to an acceptable image. The blue, red and green images were carefully aligned and images of different contrast were observed. It was determined that any blue blur could only be discerned by careful examination of white lines on a dark background, but was not noticeable for dark lines on a bright background. This suggests that reduction of the blue astigmatism may not be as important as reduction of green and red astigmatism. A possible reason for this is that the density of blue receptors in the human eye is less than that for green and red receptors, and so the normal resolution of blue images is less than for green or red images.

Figure 4:
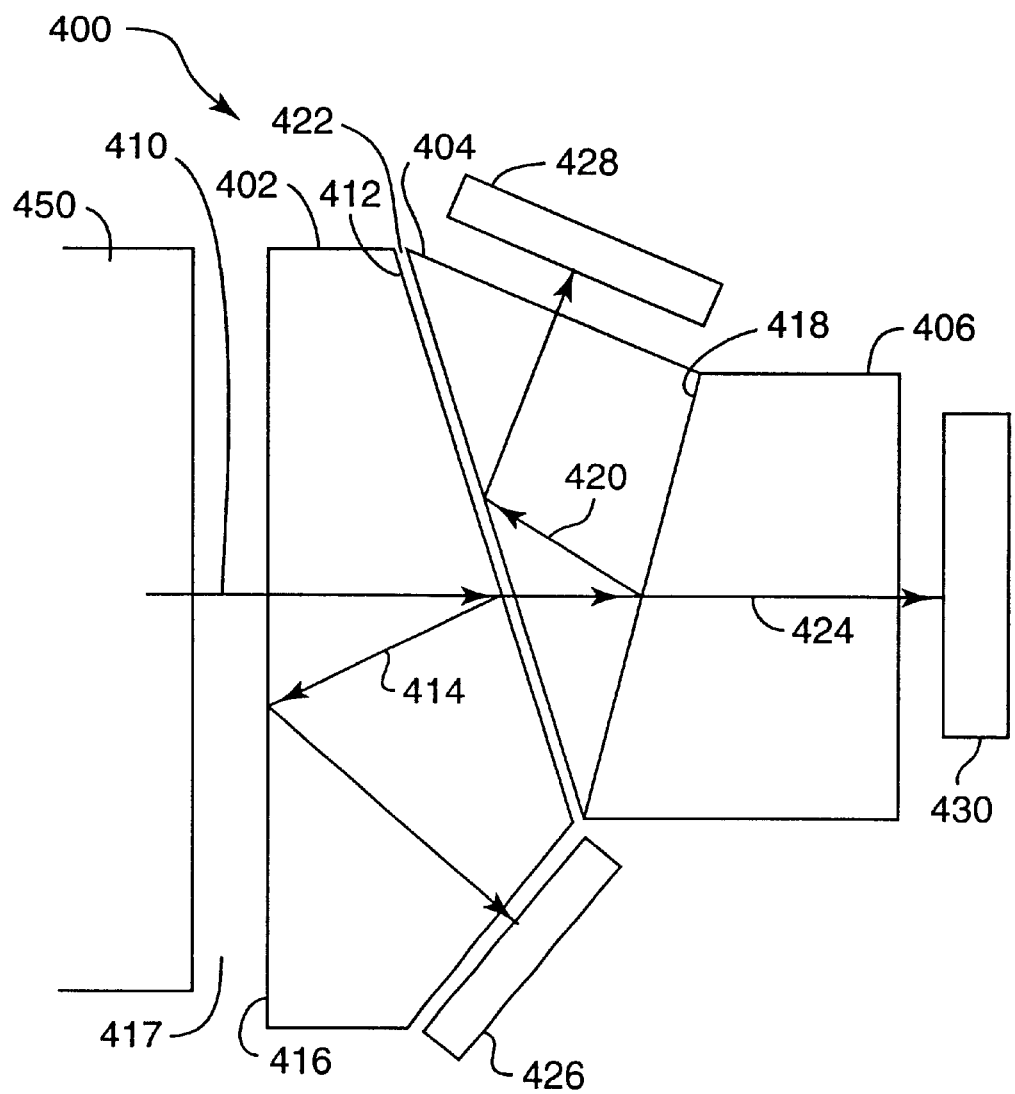
FIG. 4 schematically illustrates a first approach to reducing astigmatism in a projector system, based on a gap in a color prism, according to an embodiment of the present invention.
Figure 5:
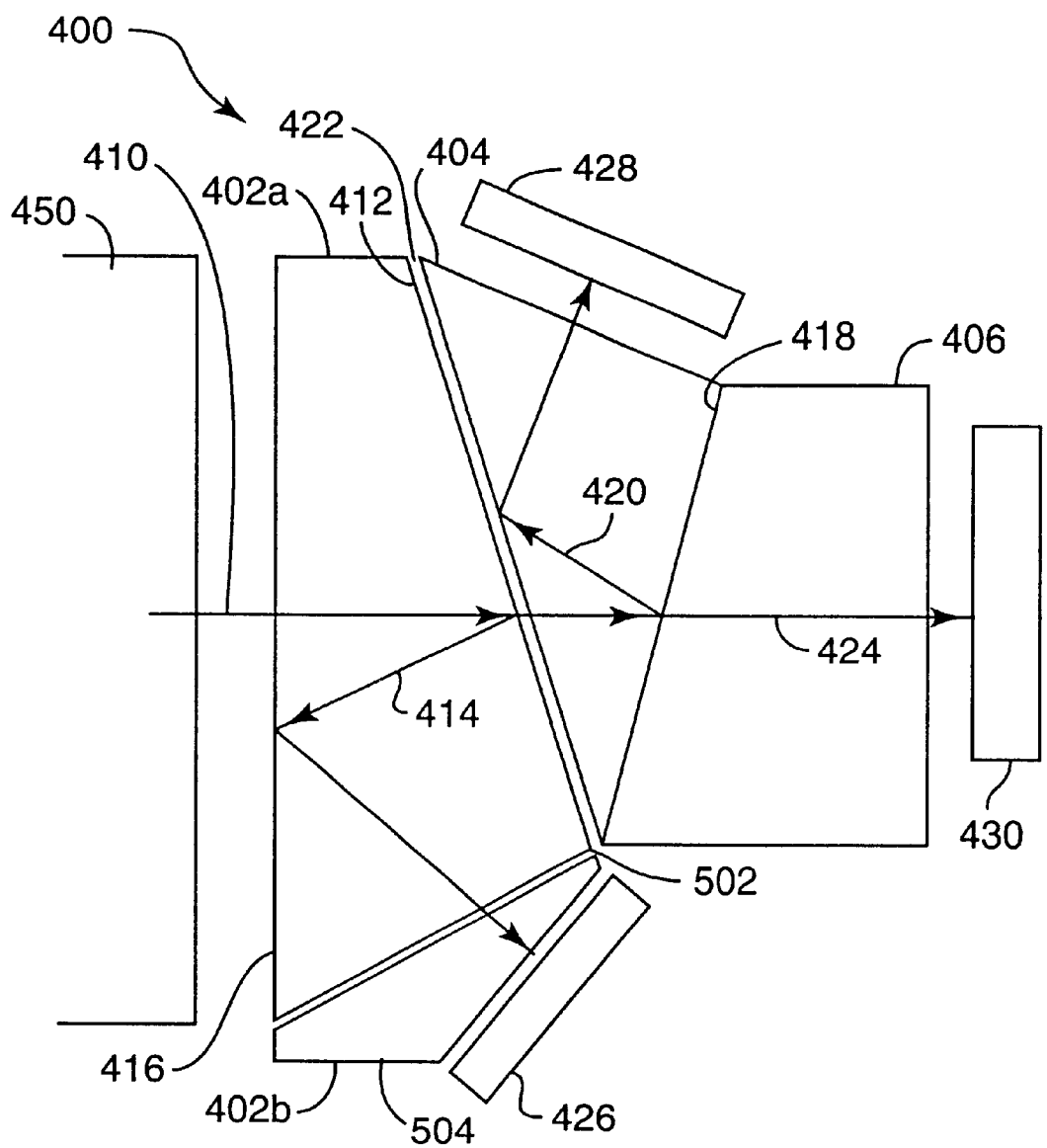
FIG. 5 schematically illustrates another approach to reducing astigmatism in a projector system, based on gaps in a color prism, according to another embodiment of the present invention.

Astigmatism for the first color band may be corrected, however, using the approach illustrated in FIG. 5, which shows a color prism similar to that illustrated in FIG. 4, except that the first prism 402 is formed from two parts 402a and 402b, with an air gap 502 therebetween. A blunt tip 504 is desired on the acute angle end of prism 402b for manufacturing reasons. Preferably, the size and position of the gap 502 are such that the air gap 502 does not obstruct the light 410 entering the color prism 400 from the PBS 450. Also, the size and position of the gap 502 are such that the gap 502 is not in the path of the light 414 of the first color band until the light 414 has totally internally reflected off the input face 416. Using expression (1) above, the air gap 502 should be around 0.875 mm in width, at an angle of about 32.25°, to compensate for an astigmatism of 196 μm, whereas the astigmatism corrected for in the other gap 422 may be of a different value. While this rather large separation may induce other aberrations, it is possible to use smaller gaps that introduce smaller aberrations, in order to partially compensate the astigmatism. Those skilled in the art will appreciate that it is possible to optimize the image either through optical simulations on a computer, or through empirical trials.

It will be appreciated that the air gaps 422 and 502 are examples of sheets of lower refractive index material, air, surrounded by higher index material, for example prism glass. The gaps 422 and 502 need not be filled only with air, although air is useful since it gives a large refractive index difference with the prism material. The gaps 422 and 502 may also be filled with another material of a relatively low refractive index, other than air. It will be understood, however, that the refractive index difference between, for example the second prism 404 and the gap 422, should be sufficient to maintain total internal reflection of the light 420, even when the gap 422 is not filled with air. Likewise, other gaps discussed below need not be filled with air, but need only be filled with a material that has a lower refractive index than the material surrounding the gap.

Figure 6:
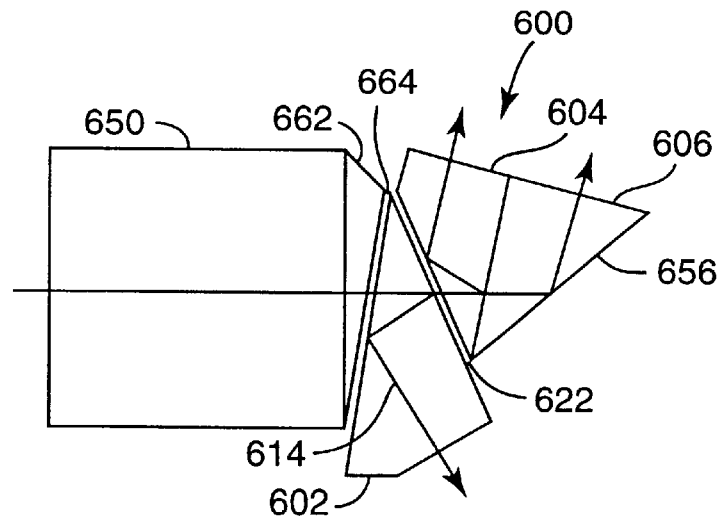
FIG. 6 schematically illustrates another approach to reducing astigmatism in a projector system, based on a gap between a wedge prism and a color prism, according to another embodiment of the present invention.

Another approach to correcting the astigmatism is described with reference to FIG. 6. In this embodiment, a wedge prism 662 is disposed between the color prism 600 and the PBS 650, with a gap 664 between the wedge prism 662 and the color prism 600. The color prism 600, known as a modified Philips prism, is formed from first, second and third prisms 602, 604 and 606, with a totally internally reflecting gap 622 between the first and second prisms 602 and 604. In the illustrated embodiment, the third prism 606 also includes a totally internally reflecting surface 656. This need not be the case, and the third prism 606 may be formed using a geometry that does not include a totally reflecting surface.

In conventional wedge prism systems, the air gap 664 between the wedge prism 662 and the first prism 602 is only sufficiently large as to permit total internal reflection of light 614 of the first color band reflected within the first prism 602. However, the air gap 664 between the wedge prism 662 and the first prism 602 may be selected to have a larger width so as to substantially reduce and correct the astigmatism arising within the PBS 650. The width of the gap 664 is selected according to expression (1).

For example, where the astigmatism of the PBS 650 is 181 $\mu$m, and the wedge angle of the wedge prism 662 is 10°, expression (1) suggests that the astigmatism may be corrected by an air gap 664 of around 2.104 mm.

It will be appreciated that, although the low index plate has been described with reference to FIGS. 4–6 as an air gap, other materials having a low refractive index may also be used, for example a low index polymer film. Furthermore, it is possible to use a combination of gaps between prisms of the color prism and a gap between the color prism and the wedge prism to compensate for astigmatism. It will further be appreciated that astigmatism reduction may be implemented in different embodiments of color prisms other than those illustrated here.

The second approach to correcting for the astigmatism in the PBS introduced above is to introduce a plane of relatively high refractive index that is inclined about an axis parallel to the axis of inclination of the PBS polarizer film. This approach is useful where the color prism is not rotated relative to the PBS and, therefore, the nominally s-polarized light from the PBS is also nominally s-polarized within the color prism.

Figure 7:
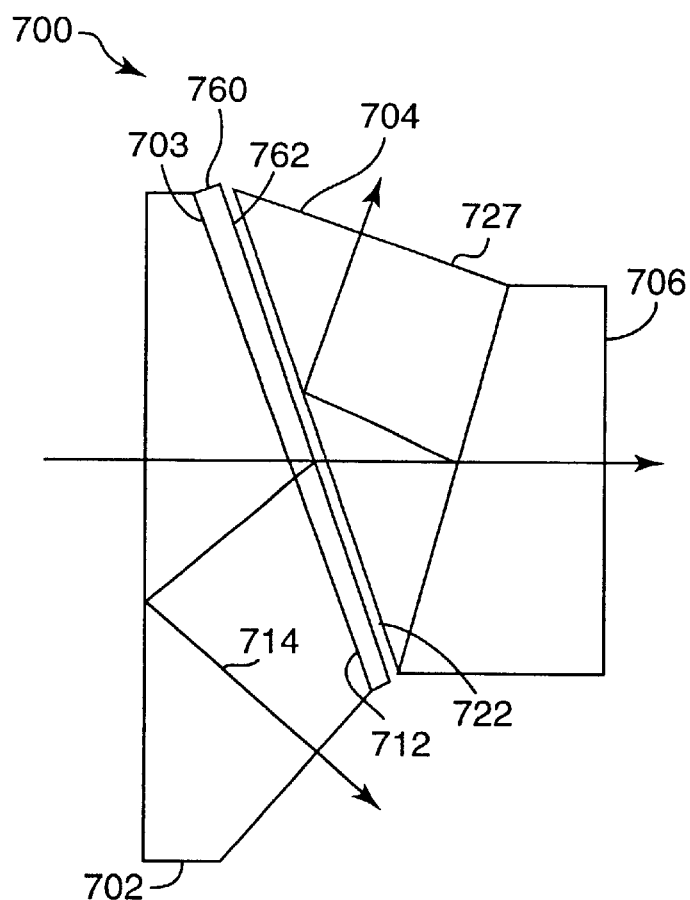
FIG. 7 schematically illustrates another approach to reducing astigmatism in a projector system, based on a plate positioned between elements of a color prism, according to another embodiment of the present invention.

One particular embodiment of this approach is illustrated in FIG. 7, which shows a color prism 700 formed from first, second and third prisms 702, 704 and 706. A high index plate 760, formed from a transparent material having a higher refractive index than the first and second prisms 702 and 704 is disposed on the output surface of the first prism 702. An air gap 722, typically about 10 $\mu$m wide, is provided between the high index plate 760 and the second prism 704 so that light in the second color band is internally reflected within second prism 704 towards the output face 727.

Where the first filter 712 is disposed on the second surface 762 of the high index plate 760, the light in the first color band 714 passes through the high index plate twice before exiting the first prism 702, whereas the light 720 in the second color band and the light 724 in the third color band only pass through the high index plate 760 once before exiting the second and third prisms 704 and 706. Thus, the light in the first color band experiences a different amount of astigmatism correction from the second and third color bands. Since the astigmatism of blue light is less significant to the viewer's perception of an image than green or red light, as has been discussed above, this embodiment may provide adequate astigmatism compensation where the first color band is blue light.

In another embodiment, the first filter 712 may be placed on the output surface 703 of the first prism. In this embodiment, the light 714 in the first color band does not pass through the high index plate 760, and so the light 714 in the first color band experiences no astigmatism correction. As is discussed above, where the light 714 in the first color band is blue, the astigmatism correction to the green and red light only may provide sufficient correction for viewing.

Figure 8:
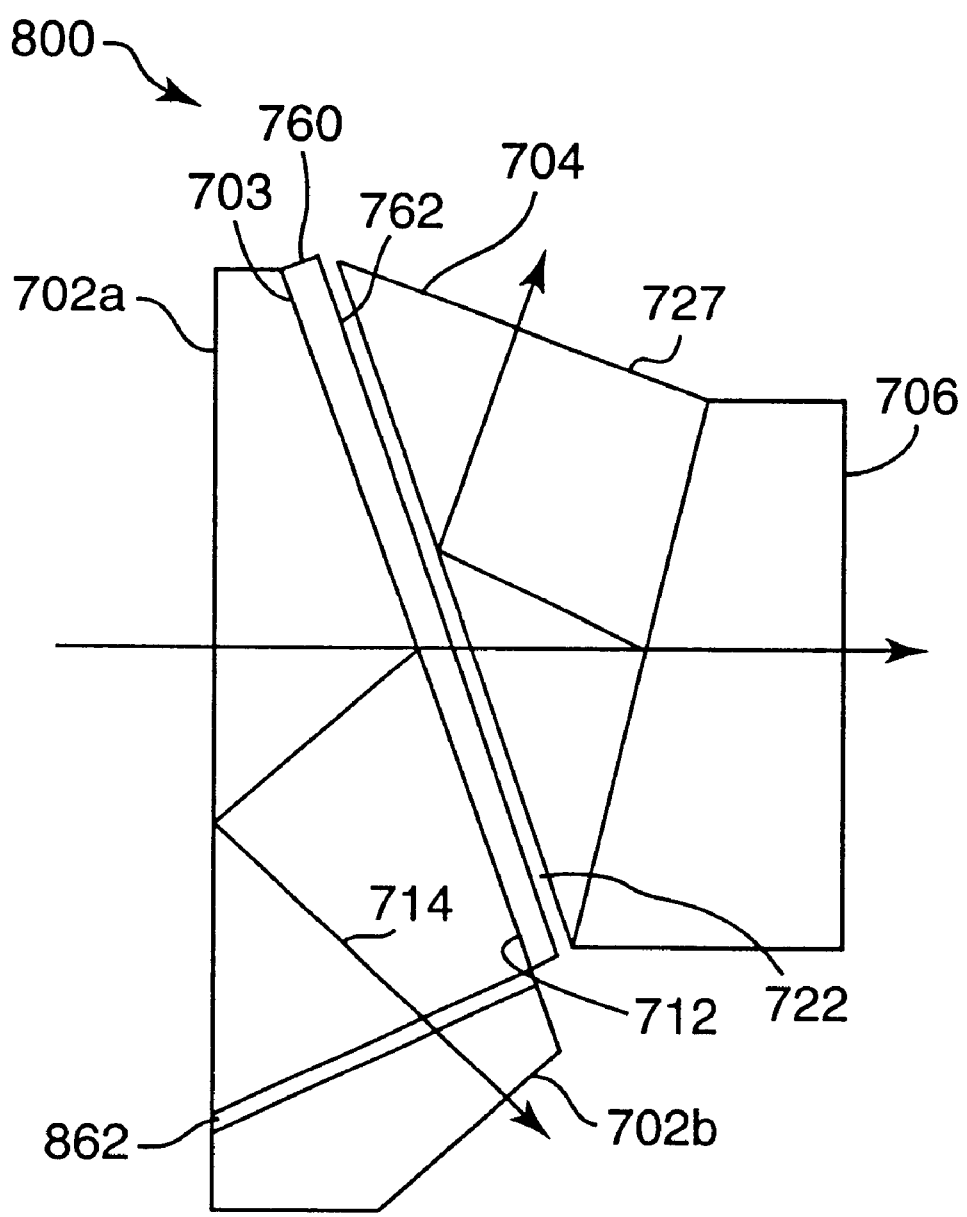
FIG. 8 schematically illustrates another approach to reducing astigmatism in a projector system, based on plates positioned between and within elements of a color prism, according to another embodiment of the present invention.

In another embodiment, illustrated in FIG. 8, the first prism 702 may be split into two parts 702a and 702b. A second high index plate 862 may be positioned between the prism parts 702a and 702b, having a thickness, angle of orientation and refractive index selected to reduce astigmatism in the first color band. This embodiment is particularly useful where the filter 712 is positioned between the first prism part 702a and the high index plate 760. Thus, the color prism 800 may provide correction for all three color bands.

Astigmatism correction may also be implemented in an X-cube beamsplitter/combiner. An embodiment of a projection engine 900 that uses an X-cube beamsplitter and combiner is partially illustrated in FIG. 9. Light 902 from a light source (not shown) is incident on an X-cube beamsplitter 904, that separates the light 902 into three color bands. Light 906 in the first color band is transmitted through the X-cube beamsplitter 904 to the first reflector 908, while light 910 in the second color band is reflected by the X-cube beamsplitter 904 into the plane of the figure towards the second reflector 912. Light 914 in the third color band is reflected in a direction out of the plane of the figure towards a third reflector. Optical elements for operating on the third color band are not shown in the figure for the sake of clarity. In the projection engine 900 that uses three PBSs, the back focal length may be reduced, thus permitting the use of a simplified projection lens system. Furthermore, the weight of the projection lens system required for wide field angle may be reduced.

The first and second reflectors 908 and 912 respectively reflect light in the first and second color bands towards first and second polarizing beamsplitters 916 and 918. The first and second reflectors may be mirrors, for example multi-layer mirrors or metal mirrors, or may be reflecting polarizers oriented to reflect light in the desired polarization state towards the first and second polarizing beamsplitters 916 and 918.

Light in the first color band 906 is reflected by the first PBS 916, having an MPBR film 917, towards a first reflecting imager 920 that reflects the light 906 in the first color band and rotates polarization of selected portions of the wavefront of the light 906 to create an imaged beam 922 of light in the first color band that is transmitted through the first PBS 916 to the X-cube combiner 924. Similarly, light 910 in the second color band is reflected by the second PBS 918 towards the second reflecting imager 926. The second reflecting imager 926 produces an imaged beam 928 of light in the second color band that is transmitted through the second PBS 918 towards the X-cube combiner 924.

It will be appreciated that the projection engine 900 also includes a third reflector (not shown), a third PBS (not shown) and a third imager (not shown) to produce an imaged beam 930 of light in the third color band that is directed to the X-cube combiner 924 from a direction out of the plane of the figure. The three imaged beams 922, 928 and 930 are combined in the X-cube combiner to produce a three color image beam 932 that is typically projected to a screen by a set of projection optics.

Figure 10A:
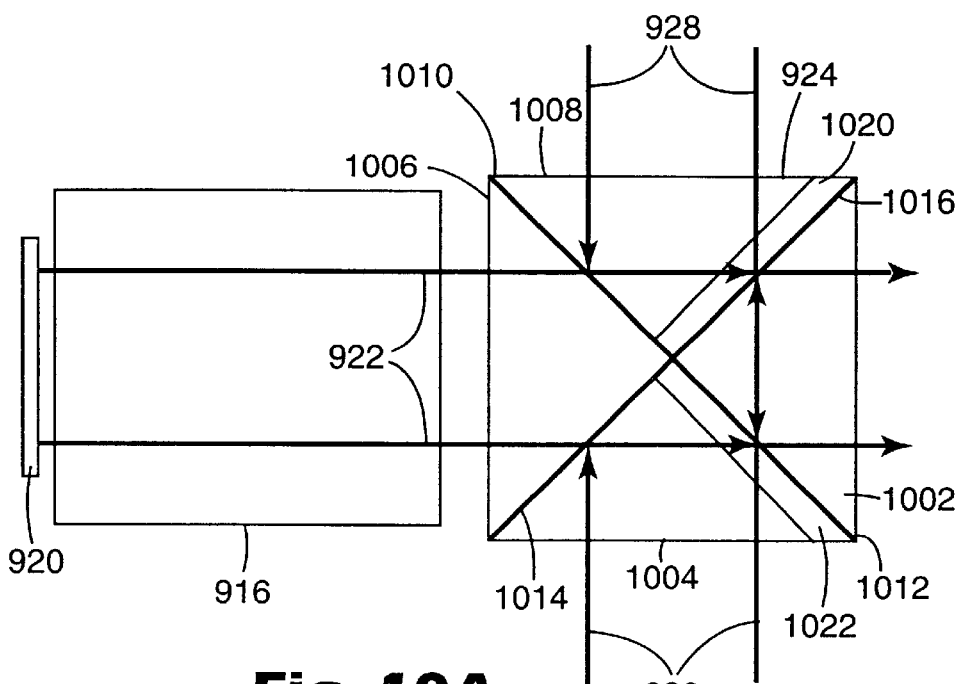
FIGS. 10A and 10B illustrate different orientations of x-cube color combiner relative to polarization beamsplitter, according to embodiments of the present invention.

A more detailed illustration of the X-cube combiner 924 is presented in FIG. 10A, showing a cross-section through the X-cube combiner in the plane of the imaged beams 922, 928 and 930. The X-cube combiner 924 is assembled from four right-angled prisms 1002, 1004, 1006 and 1008, having various reflective coatings, for example multilayer dielectric reflective coatings, between certain interfaces of the prisms 1002–1008. Coatings 1010 and 1012 reflect the imaged beam 928 in the second color band and coatings 1014 and 1016 reflect the imaged beam 930 in the third color band.

Two slabs 1020 and 1022 are inserted into the X-cube combiner 924 in positions so that the light in each imaged beam 922, 928 and 930, except for a small central portion of the first imaged beam 922, passes through either one of the slabs 1020 or 1022 only once. In the illustrated embodiment, the first slab 1020 is disposed between the fourth prism 1008 and the first prism 1002, and the second slab 1022 is disposed between the first and second prisms 1002 and 1004.

Figure 9:
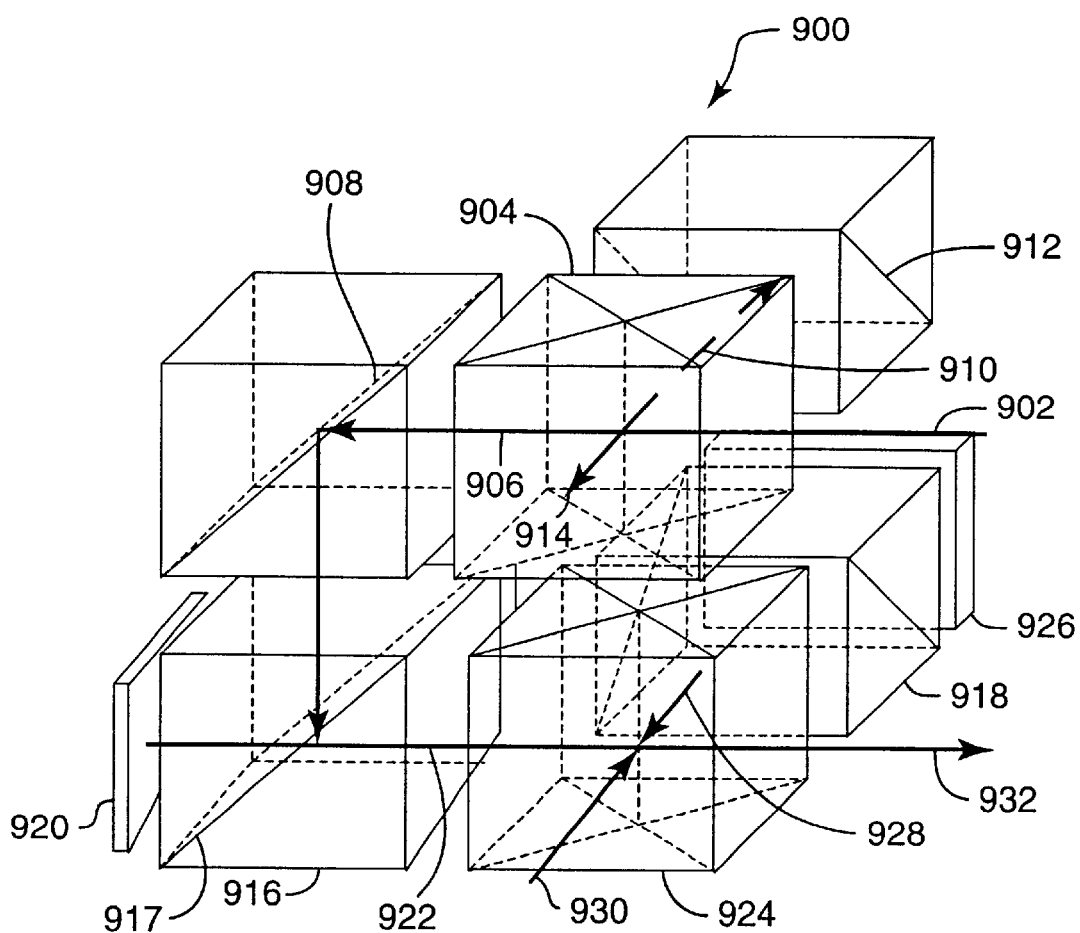
FIG. 9 schematically illustrates another approach to reducing astigmatism in a projector system having an x-cube color combiner, according to another embodiment of the present invention

In the embodiment illustrated in FIGS. 9 and 10A, the axis of rotation of the MPBR film 917 and the axes of rotation of the slabs 1020 and 1022 are perpendicular. Therefore, the refractive index of the slabs 1020 and 1022 is selected to be less than the refractive index of the prisms 1002–1008. For example, the prisms may be formed from SF57 glass, whereas the slabs 1020 and 1022 are formed from a lower index glass, such as BK7, having a refractive index of 1.517. The thickness of the slabs 1020 and 1022 is preferably selected to at least partially compensate for the astigmatism arising in the PBSs. For example, where the astigmatism is 181 $\mu$m, the prisms 1002–1008 are formed from SF57 glass, and the slabs 1020 and 1022 are formed from BK7, the astigmatism is corrected where the slab thickness is 150 $\mu$m. It is assumed that the angle of incidence in the X-cube combiner 924 is 45°.

The central portion of the first imaged beam 922, having a width d1, does not make a single pass through the entire thickness of either of the slabs 1020 and 1022, and so is may not be corrected for astigmatism. Typically, the area of the central portion is small relative to the clear aperture of the beam 922, and so the amount of light that is not corrected for astigmatism is small, a few % of the total output light. The central portion may be uncorrected for astigmatism, or may be blocked, for example using black paint, which produces less than 5% power loss. The overall effect of not correcting the central portion of the beam 922 may be reduced if the beam 922 contains light of a color band that produces a smaller astigmatism effect in the viewer's on the eye, for example blue light.

Figure 10B:
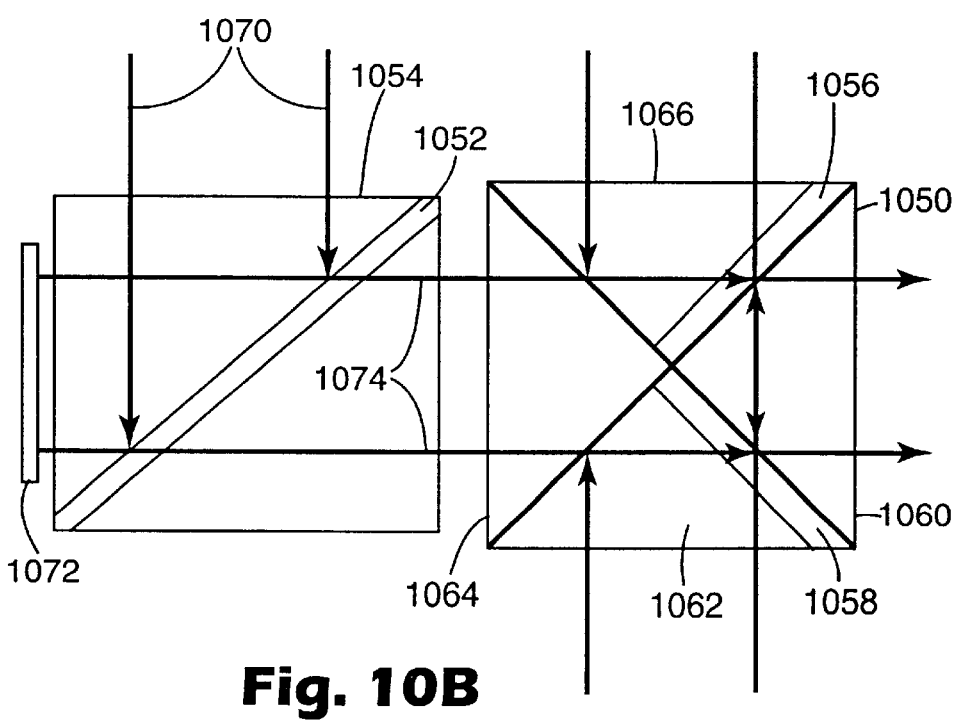

Another embodiment of X-cube combiner 1050 is illustrated in FIG. 10B. Light 1070, of one color band, enters the PBS 1054 and is reflected to the imager 1072, which rotates polarization of certain portions of the light 1070 to form image light 1074. The image light 1074 is transmitted through the PBS 1054 to the X-cube combiner 1050. Image light 1076 of one or more color bands is directed into the X-cube combiner 1050 and combined with the image light 1074.

In this embodiment, the rotation axis of the MPBR film 1052 in the PBS 1054 is parallel to the axis of rotation of the slabs 1056 and 1058. Accordingly, the refractive index of the slabs 1056 and 1058 is selected to be greater than the refractive index of the prisms 1060–1066 that form the X-cube combiner.

The glass selection for the X-cube combiner 1050 is not limited to high index glasses, and so the combiner 1050 may be formed from a more common type of glass, such as BK7. If the astigmatism introduced by PBS 1054 is around 181 $\mu$m, then the thickness of the slabs 1056 and 1058 needed to achieve astigmatism correction is calculated to be around 1.1 mm where the slabs 1056 and 1058 are formed from PBH71 glass and the prisms 1060–1066 are formed from BK7.

Figure 11:
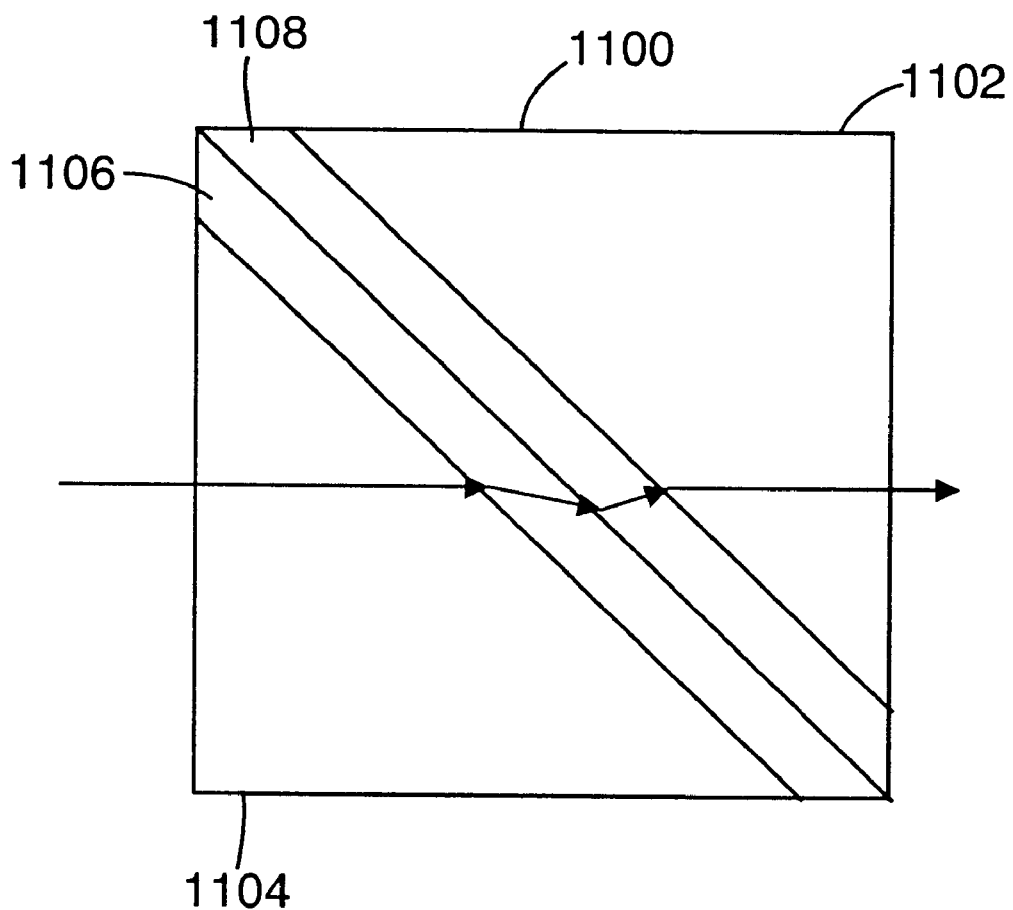
FIG. 11 schematically illustrates another approach to reducing astigmatism in a projector system, based on a plate positioned within a polarization beamsplitter, according to another embodiment of the present invention.

Another particular embodiment of astigmatism correction in a projector system that uses a plate of a relatively high refractive index material, illustrated in FIG. 11, is to include the plate of relatively high refractive index material in the PBS 1100.

The PBS 1100 is formed from two prisms 1102 and 1104 with two layers, an MRPB/adhesive layer 1106 and a high index layer 1108, sandwiched between the prisms 1102 and 1104. The refractive index, $n_2$, of the high index layer 1108 is higher than the refractive index, $n_0$, of the prisms 1102 and 1104. Where the refractive index of the MRPB/adhesive layer 1106 is given by $n_1$, the following relationship holds: $n_2 > n_0 > n_1$. The thickness, $d_2$, of the high index layer 1108, is selected so that the astigmatism introduced by the high index layer 1108 reduces the astigmatism arising from the MRPB/adhesive layer 1106. For example, where the prisms 1102 and 1104 are formed from PBH55 glass with a refractive index of 1.85 and the MRPB/adhesive layer 1106 has a thickness of 225 $\mu$m with a refractive index of 1.56, the astigmatism is 181 $\mu$m. This value of astigmatism may be compensated using a 3.8 mm thick layer of PBH71 glass, having a refractive index of 1.92, as the high index layer 1108. It will be appreciated that an adhesive layer may be used for attaching the high index layer to the prism: the effect of such an adhesive layer has been ignored here for simplicity. Chromatic dispersion in the PBS 1100 may lead to color shift effects where light at one color is translated across the image relative to light of another wavelength. The effect of color shift may be reduced using, for example, a second PBS following the first PBS, where the second PBS is oriented to transmit the image light and to provide a color shift that compensates for the color shift arising in the first PBS 1100.

The PBS 1100 may be used where there is only one imager, and no color prism is present. One of the advantages of using only a single imager is that there is no need to align the image formed by one imager over the image formed by another imager, as is the case in a multiple-imager projection engine. Another advantage is that, since there is no requirement for a color separator/combiner, such as a color prism, x-prism, or the like, the back focal length of the engine can be reduced, and so low f-number projection lens systems may be used, for example as low as f/1.8 or less.

Usually, single panel imagers operate with some kind of color selection schemes, such as a color wheel or fast tunable color filters. Accordingly, only about one third of the light incident on the imager, contained within one of three color bands, is used at any one time, and so high light efficiency is even more desirable in a single panel engine than in a three panel engine. With an f-number of f/1.8, the system étendue is 2.7 times greater than that of an engine having an f-number of f/3.0, and so the total light throughput of the engine is increased at lower f-numbers. Additionally, the coherence length of the projection engine is reduced at lower f-number, resulting in lower speckle.

Figure 12:
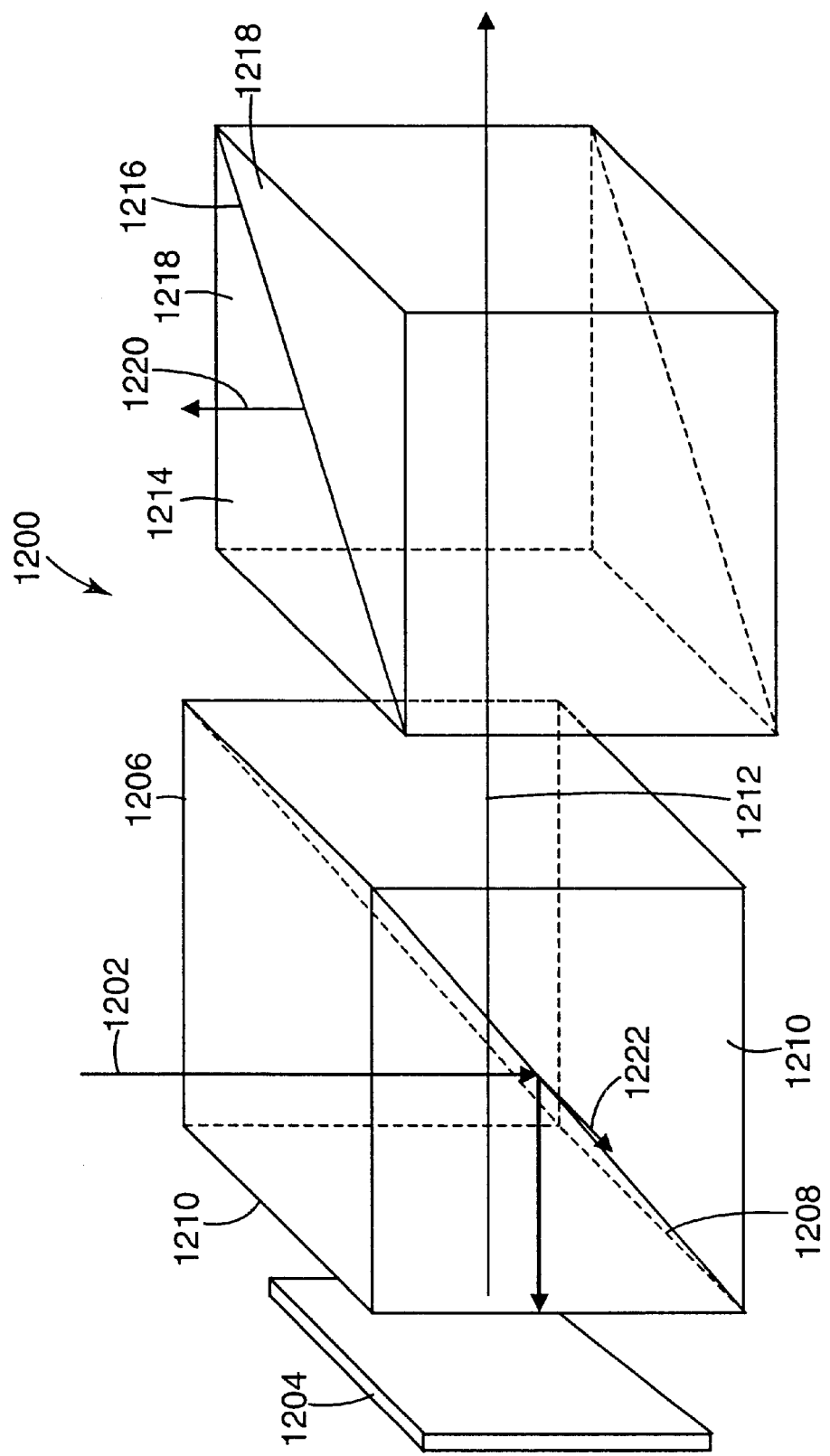
FIG. 12 schematically illustrates another approach to reducing astigmatism in a projector system, based on a second, low index film, according to an embodiment of the present invention.

Another approach to compensating astigmatism in a system that uses only a single imager is illustrated in the embodiment shown in FIG. 12. Light 1202 from a light source (not shown) is reflected towards the imager 1204 by a PBS 1206 formed from an MRPB film 1208 sandwiched between glass prisms 1210. The image light 1212 reflected from the imager 1204 is transmitted through the PBS 1206. The image light 1212 is astigmatic due to the passage through the PBS 1206.

The image light 1212 is passed through an astigmatism-correcting cube 1214, having a film 1216 of relatively low refractive index sandwiched between two prisms 1218 of relatively high refractive index. The plane of the film 1216 is rotated around a rotation axis 1220 that is perpendicular to the rotation axis 1222 of the MRPB film 1208 in the PBS 1206. The thickness and angle of the film 1216 may be selected to reduce or substantially correct astigmatism arising in the PBS 1206 or in other components of the projection system.

In one embodiment, the cube 1214 may be formed from an MRPB film 1216 similar to the MRPB film 1208, sandwiched between two glass prisms 1218 similar to the glass prisms 1210 of the PBS 1206. In such a case, the MRPB film 1216 is oriented so as to transmit the image light 1212. The second MRPB film 1216 may be used as a post-polarizer, thus increasing the contrast by reducing the transmission of the light in the polarization state blocked by the PBS 1206.

The optical requirements of the first MRPB film 1208, namely high transmission of one polarization state and high reflection of the other polarization state, are high so that good contrast is obtained in the image beam 1212. This means that only the best performing sections of a manufactured length of MRPB film are suitable for use as the first MRPB film 1208. However, the optical requirements of the second MRPB film 1216 are more relaxed, since it is not the primary means of generating contrast, and is used primarily for astigmatism compensation and for clean up. The extinction ratio for transmitted light may be in the range 100:1–10:1. Therefore, the second MRPB film 1216 may be formed from less than optimally performing sections of a manufactured length of MRPB film, thus increasing the fraction of a manufactured length of MRPB film that is useful.

The cube 1214 may also be a MacNeille PBS having a thick plate. It is possible to use the MacNeille PBS in this embodiment because it is only operating in transmission, and light reflected by the MacNeille PBS, which contains mixed polarization states, is disregarded. Where a MacNeille PBS is used, the second cube may be formed from BK7 glass.

It will be appreciated that the embodiment of astigmatism correction illustrated in FIG. 12 may also be implemented in a multiple-imager imager core, where a color separator/combiner is used between the PBS 1206 and the imagers.

Figure 13:
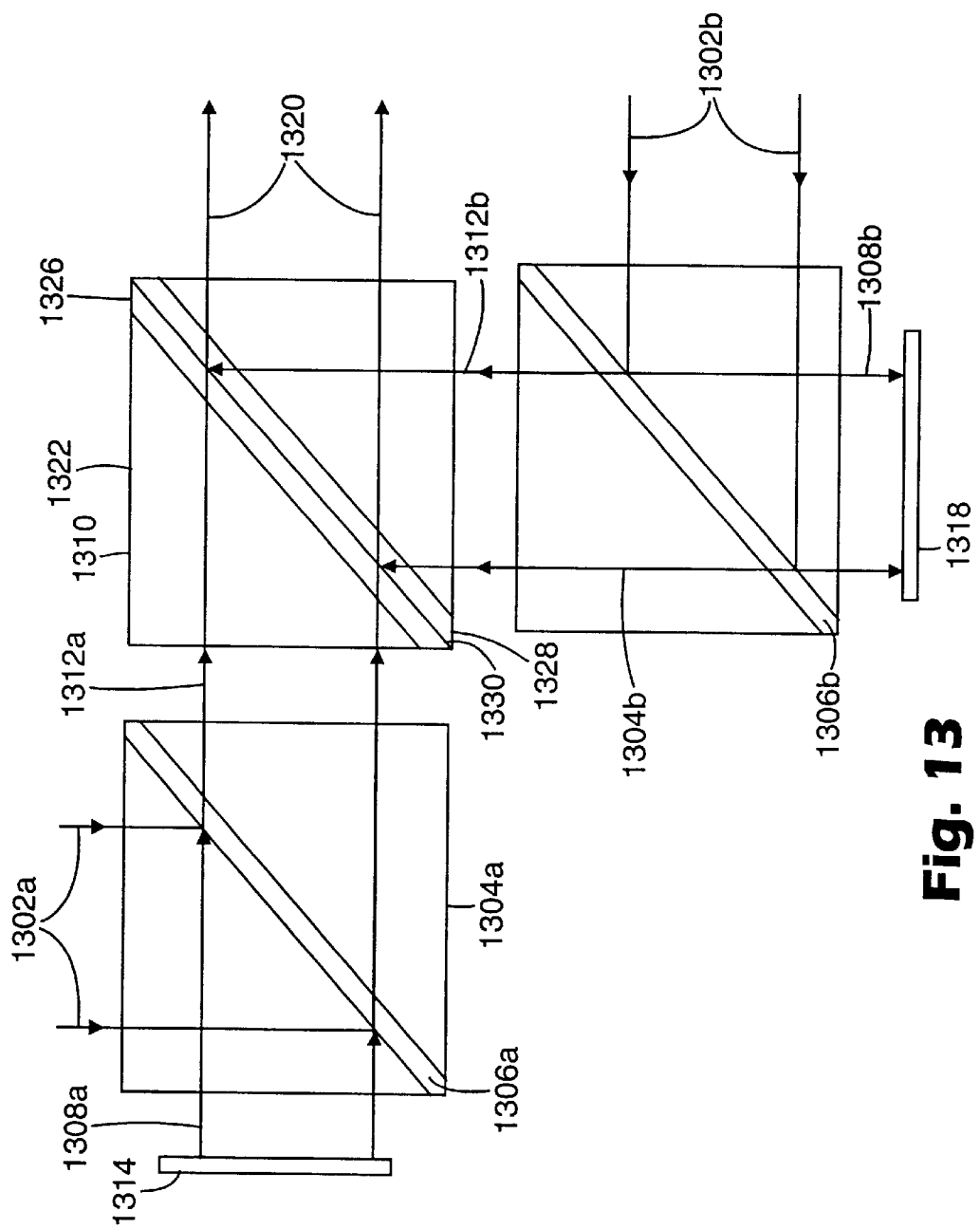
FIG. 13 schematically illustrates an approach to reducing astigmatism in a two imager projection engine, according to an embodiment of the present invention.

Another particular embodiment of astigmatism correction, that is advantageous for correcting astigmatism in a projection engine 1300 based on two imagers, is schematically illustrated in FIG. 13. In this embodiment, light 1302a and 1302b, from a light source (not illustrated) is incident on respective Cartesian PBSs 1304a and 1304b. The different light beams 1302a and 1302b may be generated by separating the light from a light source using a reflective dichroic filter or by any other suitable method for producing two color bands. The PBSs 1304a and 1304b may use respective MRPB films 1306a and 1306b to reflect light in a particular polarization state. The light 1308a and 1308b reflected from the PBSs 1304a and 1304b is directed to the respective imagers 1314 and 1318. Image light 1312a reflected by the first imager 1314 is transmitted through the PBS 1304a to the dichroic combiner 1310. Image light 1312b reflected by the second imager 1318 is transmitted through the PBS 1304b to the dichroic combiner 1310. The image light 1312a, in the first color band, is transmitted through the dichroic combiner 1310 while the image light 1312b, in the second color band, is reflected by the dichroic combiner 1310 so as to combine with the first image light 1312a, and produce the combined image light output 1320.

The dichroic combiner 1310 is formed from two prisms 1322 and 1324, typically glass prisms. The prisms 1322 and 1324 are formed from material having a first refractive index. Each prism 1322 and 1324 has a respective plate 1326 and 1328 of high index material, for example high index glass, along its base. A dichroic film 1330 is disposed between the two plates 1326 and 1328 of high index material.

Figure 14:
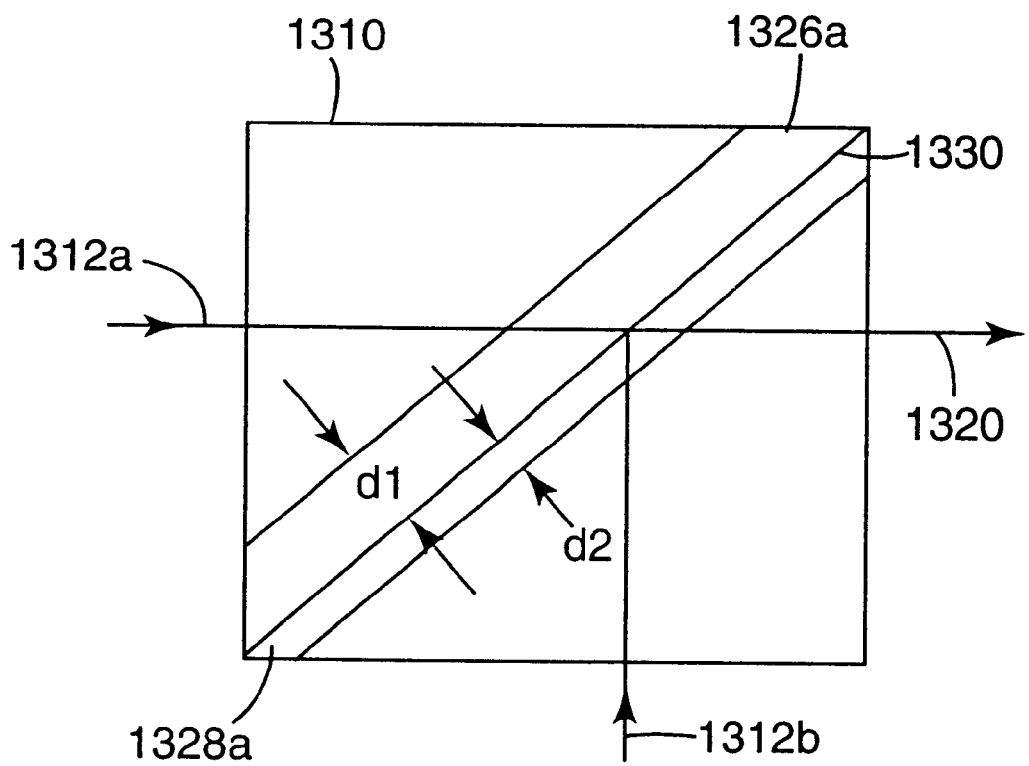
FIG. 14 schematically illustrates another approach to reducing astigmatism in a two imager projection engine, according to another embodiment of the present invention.

The plates 1326 and 1328 of high index material are selected to have thicknesses that substantially reduce astigmatism, for example the astigmatism arising in the PBSs 1304a and 1304b. The plates 1326 and 1328 may be selected to have equal thicknesses, as illustrated. The plates 1326 and 1328 may also be selected so that one plate is thicker than the other, as shown in FIG. 14. This latter embodiment may be advantageous, for example, where it is determined that one color band requires more astigmatism correction than the other color band. For example, the color band having the shorter wavelength range may be determined to require less astigmatism correction than the light in the longer wavelength band. Where the first plate 1326a has a thickness d1 and the second plate 1328a has a thickness d2, the light 1312a in the first color band passes through a combined thickness of high index material of d1+d2. On the other hand, light 1312b in the second color band passes through a combined thickness of high index material of 2×d2. Thus, where d1>d2, the image light 1312a in the first color band experiences a greater amount of astigmatism correction than the image light 1312b in the second color band.

Figure 15:
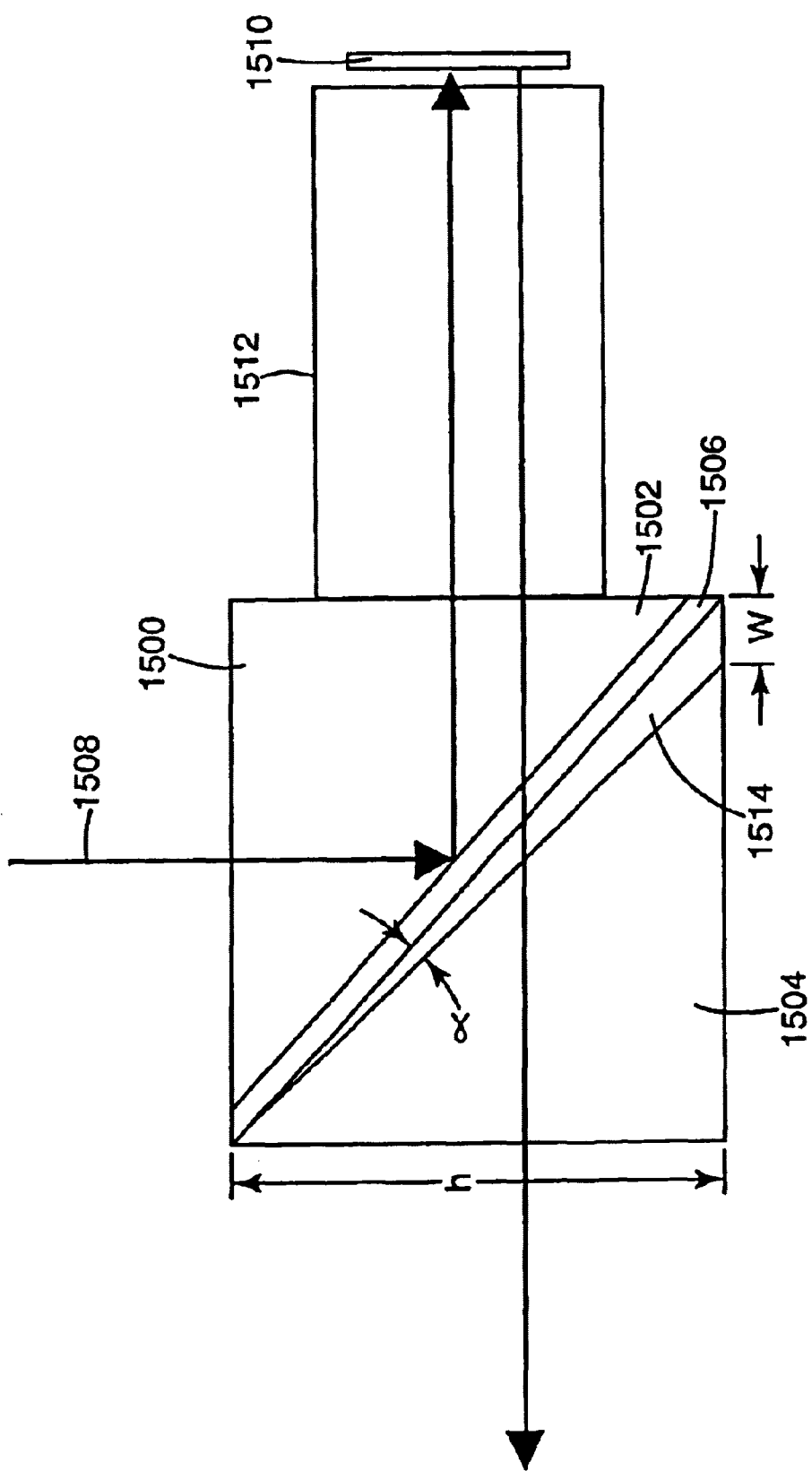
FIG. 15 schematically illustrates another approach to reducing astigmatism in a projector system, based on a wedged component within a polarizing beamsplitter, according to another embodiment of the present invention.

In addition to adding slabs of high index or low index to the optical system for astigmatism reduction, astigmatism may also be reduced by introducing a wedged component into the optical system. One particular embodiment of a wedged astigmatism correction element is featured in FIG. 15, which shows a PBS 1500 formed of two glass prisms 1502 and 1504, with an MRPB film 1506 sandwiched therebetween. Light 1508 from a light source (not shown) is reflected by the MRPB film 1506 to at least one imager 1510. If more than one imager 1510 is used, a color prism 1512 may be placed between the PBS 1500 and the multiple imagers.

A wedge plate 1514 is disposed between the MRPB film 1506 and one of the prisms 1502 and 1504. The wedge plate 1514 may be formed of any suitable transparent material. For example, the wedge plate 1514 may be formed of glass or polymer. In one particular embodiment, the wedge plate 1514 is formed from optical adhesive, such as Norland 61 that adheres the MRPB film 1506 to the prism 1504.

The embodiment is illustrated further with an example. For glass prisms 1502 and 1504 formed from SF57 glass and an MRPB film/adhesive layer thickness of 225 $\mu$m, the wedge angle, a, required for astigmatism correction is between 0.15°–0.25°, calculated using a ray tracing program, ZEMAX. For a prism height of h, the wedge thickness, w, on the wide side of the wedge 1514 is given by the expression:

$$w = h \cdot \sqrt{2} \cdot \alpha \cdot \frac{\pi}{180} \qquad (2)$$

Where h=35 mm, the thickness, w, is calculated to be 129 μm, and so the optical path length change at the center of the PBS is equal to 65 μm. The wedge may be formed of optical adhesive by placing a 129 μm spacer on one side of the prism 1504 and filling the resulting wedged space with optical adhesive. The optical adhesive may then be cured using UV light.

The spacers may be glass or plastic spheres deposited along only the wide side of the wedge. Alternatively, the spacers may be structures embossed into the MRPB film 1506 or attached to the PBS prism 1504. If manufacturing tolerances are suitably high, there may be no spacer at all. A machine may automatically create the gap for the wedge to be filled with adhesive during manufacture simply by tilting one of the prisms with respect to the other. The shape of the other prism 1502 may be adjusted to correct for non-parallelism in the PBS 1500 in the imaging path.

One of the advantages of using a wedged element 1514 to correct for astigmatism is that the total thickness of the PBS is less than, for example, the embodiment illustrated in FIG. 11, where the addition of the high index pate increased the optical path by over 5 mm. Since the wedge angle is small, the wedge 1514 may be formed simply from the adhesive used to attach the MRPB film 1506 to the prisms 1502 and 1504. No extra optical components, such as slabs, are required in the wedged PBS assembly. It will be appreciated that wedge astigmatism compensation may be introduced in other components, for example in a dichroic separator/combiner or in an X-cube combiner.

As noted above, the present invention is applicable to display devices, and is believed to be particularly useful in reducing astigmatism in a projection system, for example astigmatism introduced by a polarizing beamsplitter that uses a polymeric multilayer, reflective polarizing beamsplitter film. A common type of polymeric multilayer, reflective polarizing beamsplitter film is a matched index multilayer film. The invention may also be used to reduce astigmatism that arises in other components of the projection system. Furthermore, the invention is applicable to projection systems having a wide range of f-number, but is believed to be particularly useful in projection systems having a low f-number.

The present invention should not be considered limited to the particular examples described above, but rather should be understood to cover all aspects of the invention as fairly set out in the attached claims. Various modifications, equivalent processes, as well as numerous structures to which the present invention may be applicable will be readily apparent to those of skill in the art to which the present invention is directed upon review of the present specification. The claims are intended to cover such modifications and devices.

We claim:

1. An optical device, comprising:
   a polarizing beamsplitter, a first path being defined through the polarizing beamsplitter for light in a first polarization state, the polarizing beamsplitter including a multilayer, polarization sensitive reflective film having a relatively low refractive index and covers on either side of the polarization sensitive reflective film having a relatively high refractive index;
   at least one imager disposed to reflect light back to the polarizing beamsplitter, portions of light received by the at least one imager being polarization rotated, polarization rotated light propagating along a second path from the imager and through the polarizing beamsplitter; and
   an astigmatism compensating element disposed on the second path to reduce astigmatism in the polarization rotated light caused by the polarizing beamsplitter, the astigmatism compensating element comprising a wedged element in the polarizing beamsplitter between the polarization sensitive reflective film and one of the covers.

2. A device as recited in claim 1, further comprising a light source to generate the light and light conditioning optics to condition the light before reaching the polarizing beamsplitter.

3. A device as recited in claim 1, further comprising a projection lens system to project image light from the at least one imager.

4. A device as recited in claim 3, wherein the astigmatism compensating element reduces the astigmatism to a value less than a depth of field of the projection lens system.

5. A device as recited in claim 1, further comprising a controller coupled to the at least one imager to control an image imposed on the light incident on the at least one imager.

6. A device as recited in claim 1, wherein the polarizing beamsplitter is a Cartesian polarizing beamsplitter having a structural orientation defining fixed axes of polarization and further comprising imager illumination optics having an f-number equal to or less than 2.5, the device having a dynamic range of at least 100 to 1 over projected color bands in the visible light range.

7. A device as recited in claim 1, wherein the multilayer, polarization sensitive reflective film lies in an x-y plane and has a thickness in a z-direction, and the film has a z-refractive index substantially matched to one of the x- and y-refractive indices.

8. A device as recited in claim 1, wherein the astigmatism compensating element includes a plate of high index material having a refractive index higher than a refractive index of material on at least one side of the plate of high index material.

9. A device as recited in claim 8, wherein the plate of high index material has a refractive index higher than a refractive index of the covers, the plate of high index material being disposed between the polarization sensitive reflective film and one of the covers.

10. A device as recited in claim 1, wherein the wedged element has a refractive index lower than the refractive index of the covers.

11. A device as recited in claim 1, wherein the wedged element is a wedged adhesive layer attaching the one of the covers to the polarization sensitive reflective film.

12. A device as recited in claim 1, wherein at least one of the covers has non-parallel optical surfaces.

13. A projection system, comprising:
   a light source to generate light;
   conditioning optics to condition the light from the light source;
   a telecentric imaging core to impose an image on conditioned light from the conditioning optics to form image light, the imaging core including a polarizing beamsplitter and at least one imager, the polarizing beamsplitter including a multilayer, polarization sensitive reflective film having a relatively low refractive index and covers on either side of the polarization sensitive reflective film having a relatively high refractive index, and the astigmatism arises at least partly in the polarizing beamsplitter, at least one element in the imaging core adapted to reduce astigmatism in the image light; and a projection lens system to project the astigmatism-reduced image light from the imaging core.

14. A device as recited in claim 13, wherein the at least one element in the astigmatism imaging core adapted to reduce astigmatism reduces the astigmatism to a value less than a depth of field of the projection lens system.

15. A system as recited in claim 13, further comprising a controller coupled to the at least one imager to control the image imposed on light incident on the at least one imager.

16. A system as recited in claim 13, wherein the polarizing beamsplitter is a Cartesian polarizing beamsplitter having a structural orientation defining fixed axes of polarization and the light conditioning optics have an f-number equal to or less than 2.5, the system having a dynamic range of at least 100 to 1 over projected color bands in the visible light range.

17. A system as recited in claim 13, wherein the polarizing beamsplitter includes a wedge disposed between the multilayer, polarization sensitive reflective film and one of the covers, the wedge having a refractive index less than the refractive index of the covers.

18. A system as recited in claim 13, wherein the polarizing beamsplitter includes a plate disposed between the multilayer, polarization sensitive reflective film and one of the covers, the plate having a refractive index higher than the refractive index of the covers.

19. A system as recited in claim 13, wherein the imager core includes an astigmatism-reducing cube disposed between the polarizing beamsplitter and the projection lens system, the astigmatism-reducing cube including a layer having a layer refractive index disposed between covers having a cover refractive index different from the layer refractive index, the layer being tilted relative to a propagation direction of the image light.

20. A system as recited in claim 19, wherein the layer is a polarizing layer.

21. A system as recited in claim 13, further comprising a color separator disposed between the polarization beamsplitter and the at least one imager.

22. A system as recited in claim 21, wherein the color separator is a color separating prism having at least first and second color separating elements separated by a gap layer of material having a refractive index different from a refractive index of the first and second color separating elements, a thickness of the gap layer being selected to reduce astigmatism in the image light.

23. A system as recited in claim 22, wherein the gap layer has a refractive index lower than the refractive index of the first and second color separating elements.

24. A system as recited in claim 22, wherein the gap layer has a refractive index higher than the refractive index of the first and second color separating elements.

25. A system as recited in claim 22, wherein the first color separating element is made of two parts separated by a second gap layer having a refractive index different from the refractive index of the first color separating element, and having a thickness selected to reduce astigmatism in the image light.

26. A system as recited in claim 25, wherein the second gap layer has a refractive index lower than the refractive index of the first color separating element.

27. A system as recited in claim 25, wherein the second gap layer has a refractive index higher than the refractive index of the first color separating element.

28. A system as recited in claim 22, further comprising a wedge prism disposed between the color separating prism and the polarizing beamsplitter, a third gap layer between the wedge prism and the color separating prism, having a refractive index different from wedge prism, having a thickness selected to reduce astigmatism.

29. A system as recited in claim 22, wherein the color separating prism separates light into different colors in a plane approximately perpendicular to a reflection plane of the polarizing beamsplitter.

30. A system as recited in claim 22, wherein the color separating prism separates light into different colors in a plane approximately parallel to a reflection plane of the polarizing beamsplitter.

31. A system as recited in claim 13, wherein the imaging core further comprises an x-cube to combine light in at least two color bands, the x-cube combiner including astigmatism-reducing slabs of material having a refractive index different from a refractive-index of x-cube prisms forming the x-cube.

32. A system as recited in claim 31, wherein the astigmatism-reducing slabs are formed of material having a refractive index lower than the refractive index of the x-cube prisms.

33. A device as recited in claim 13, wherein at least one of the covers has non-parallel optical surfaces.

34. An optical device, comprising:
a polarizing beamsplitter, a first path being defined through the polarizing beamsplitter for light in a first polarization state, the polarizing beamsplitter including a multilayer, polarization sensitive reflective film having a relatively low refractive index and covers on either side of the polarization sensitive reflective film having a relatively high refractive index;
at least one imager disposed to reflect light back to the polarizing beamsplitter, portions of light received by the at least one imager being polarization rotated, polarization rotated light propagating along a second path from the imager and through the polarizing beamsplitter; and
an astigmatism compensating element disposed on the second path to reduce astigmatism in the polarization rotated light caused by the polarizing beamsplitter, the astigmatism compensating element comprising a plate of high index material having a refractive index higher than a refractive index of the covers, the plate of high index material being disposed between the polarization sensitive reflective film and one of the covers.

35. A device as recited in claim 34, further comprising a light source to generate the light and light conditioning optics to condition the light before reaching the polarizing beamsplitter.

36. A device as recited in claim 34, further comprising a projection lens system to project image light from the at least one imager.

37. A device as recited in claim 36, wherein the astigmatism compensating element reduces the astigmatism to a value less than a depth of field of the projection lens system.

38. A device as recited in claim 34, further comprising a controller coupled to the at least one imager to control an image imposed on the light incident on the at least one imager.

39. A device as recited in claim 34, wherein the polarizing beamsplitter is a Cartesian polarizing beamsplitter having a structural orientation defining fixed axes of polarization and further comprising imager illumination optics having an f-number equal to or less than 2.5, the device having a dynamic range of at least 100 to 1 over projected color bands in the visible light range.

40. A device as recited in claim 34, wherein the multilayer, polarization sensitive reflective film lies in an x-y plane and has a thickness in a z-direction, and the film has a z-refractive index substantially matched to one of the x-and y-refractive indices.

41. An optical device, comprising:
a polarizing beamsplitter, a first path being defined through the polarizing beamsplitter for light in a first polarization state, the polarizing beamsplitter including a multilayer, polarization sensitive reflective film having a relatively low refractive index and covers on either side of the polarization sensitive reflective film having a relatively high refractive index;
at least one imager disposed to reflect light back to the polarizing beamsplitter, portions of light received by the at least one imager being polarization rotated, polarization rotated light propagating along a second path from the imager and through the polarizing beamsplitter;
a color separating prism disposed to receive light output from the polarizing beamsplitter along the first path, the at least one imager comprising multiple imagers disposed proximate respective color output faces of the color separating prism, the color separating prism including at least first and second color separating elements, the first color separating element being closer to the polarizing beamsplitter than at least the second color separating element, the first and second color separating elements being separated by a first gap layer of material having a refractive index lower than a refractive index of the color separating elements, a thickness of the gap layer being selected to reduce astigmatism arising in the polarizing beamsplitter.

42. A device as recited in claim 41, further comprising a light source to generate the light and light conditioning optics to condition the light before reaching the polarizing beamsplitter.

43. A device as recited in claim 41, further comprising a projection lens system to project image light from the at least one imager.

44. A device as recited in claim 41, wherein astigmatism of the device is reduced to a value less than a depth of field of the projection lens system.

45. A device as recited in claim 41, further comprising a controller coupled to the at least one imager to control an image imposed on the light incident on the at least one imager.

46. A device as recited in claim 41, wherein the polarizing beamsplitter is a Cartesian polarizing beamsplitter having a structural orientation defining fixed axes of polarization and further comprising imager illumination optics having an f-number equal to or less than 2.5, the device having a dynamic range of at least 100 to 1 over projected color bands in the visible light range.

47. A device as recited in claim 41, wherein the multilayer, polarization sensitive reflective film lies in an x-y plane and has a thickness in a z-direction, and the film has a z-refractive index substantially matched to one of the x-and y-refractive indices.

48. A device as recited in claim 41, wherein the first gap layer is an air gap having a thickness of at least at 50 $\mu$m.

49. A device as recited in claim 41, wherein the first color separating element is made of two parts separated by a second gap layer, the second gap layer positioned so as to be outside a path traveled through the first color separating element by light not separated by the first color separating element, the second gap layer having a thickness selected to reduce astigmatism arising in the polarizing beamsplitter for light in a wavelength range separated by the first light separating element.

50. A device as recited in claim 41, wherein the second gap layer is an air gap.

51. An optical device, comprising:
a polarizing beamsplitter, a first path being defined through the polarizing beamsplitter for light in a first polarization state, the polarizing beamsplitter including a multilayer, polarization sensitive reflective film having a relatively low refractive index and covers on either side of the polarization sensitive reflective film having a relatively high refractive index;
at least one imager disposed to reflect light back to the polarizing beamsplitter, portions of light received by the at least one imager being polarization rotated, polarization rotated light propagating along a second path from the imager and through the polarizing beamsplitter;
a color separating prism disposed to receive light output from the polarizing beamsplitter along the first path, the at least one imager comprising multiple imagers disposed proximate respective color output faces of the color separating prism; and
a wedge prism disposed between the color separating prism and the polarizing beamsplitter, a third gap layer, between the wedge prism and the color separating prism, having a thickness selected to reduce astigmatism arising in the polarizing beamsplitter.

52. A device as recited in claim 51, further comprising a light source to generate the light and light conditioning optics to condition the light before reaching the polarizing beamsplitter.

53. A device as recited in claim 51, further comprising a projection lens system to project image light from the at least one imager.

54. A device as recited in claim 53, wherein the wedge prism reduces the astigmatism to a value less than a depth of field of the projection lens system.

55. A device as recited in claim 51, further comprising a controller coupled to the at least one imager to control an image imposed on the light incident on the at least one imager.

56. A device as recited in claim 51, wherein the polarizing beamsplitter is a Cartesian polarizing beamsplitter having a structural orientation defining fixed axes of polarization and further comprising imager illumination optics having an f-number equal to or less than 2.5, the device having a dynamic range of at least 100 to 1 over projected color bands in the visible light range.

57. A device as recited in claim 51, wherein the multilayer, polarization sensitive reflective film lies in an x-y plane and has a thickness in a z-direction, and the film has a z-refractive index substantially matched to one of the x-and y-refractive indices.

58. A device as recited in claim 51, wherein the thickness of the third gap layer is selected to substantially correct the astigmatism arising in the polarizing beamsplitter.

59. A device as recited in claim 51, wherein the color separating prism includes a first color separating element and at least a second color separating element, the first color separating element being closer to the wedge prism than the at least a second color separating element, the first and second color separating elements being separated by a first gap layer, thicknesses of the first and third gap layers being selected to substantially correct astigmatism arising in the polarizing beamsplitter.

60. An optical device, comprising:
a polarizing beamsplitter, a first path being defined through the polarizing beamsplitter for light in a first polarization state, the polarizing beamsplitter including a multilayer, polarization sensitive reflective film having a relatively low refractive index and covers on either side of the polarization sensitive reflective film having a relatively high refractive index;
at least one imager disposed to reflect light back to the polarizing beamsplitter, portions of light received by the at least one imager being polarization rotated, polarization rotated light propagating along a second path from the imager and through the polarizing beamsplitter; and
a color separating prism disposed to receive light output from the polarizing beamsplitter along the first path, the at least one imager comprising multiple imagers disposed proximate respective color output faces of the color separating prism, the color separating prism comprising at least first and second color separating elements, the first color separating element being closer to the polarizing beamsplitter than at least the second color separating element, and a plate formed from a first material having a refractive index higher than a refractive index of at least one of the first and second color separating elements, being disposed between the first and second color separating elements.

61. A device as recited in claim 60, further comprising a light source to generate the light and light conditioning optics to condition the light before reaching the polarizing beamsplitter.

62. A device as recited in claim 60, further comprising a projection lens system to project image light from the at least one imager.

63. A device as recited in claim 62, wherein the plate reduces the astigmatism to a value less than a depth of field of the projection lens system.

64. A device as recited in claim 60, further comprising a controller coupled to the at least one imager to control an image imposed on the light incident on the at least one imager.

65. A device as recited in claim 60, wherein the polarizing beamsplitter is a Cartesian polarizing beamsplitter having a structural orientation defining fixed axes of polarization and further comprising imager illumination optics having an f-number equal to or less than 2.5, the device having a dynamic range of at least 100 to 1 over projected color bands in the visible light range.

66. A device as recited in claim 60, wherein the multilayer, polarization sensitive reflective film lies in an x-y plane and has a thickness in a z-direction, and the film has a z-refractive index substantially matched to one of the x-and y-refractive indices.

67. A device as recited in claim 60, wherein the plate of the first material has a thickness selected to reduce astigmatism arising in the polarizing beamsplitter.

68. A device as recited in claim 60, wherein the first color separating element is made of two parts separated by a plate of a second material different from a material of the first color separating element, the plate of second material being positioned so as to be outside a path traveled by light not separated by the first color separating element.

69. A device as recited in claim 68, a width of the plate of second material being selected to reduce astigmatism arising in the polarizing beamsplitter for light in a wavelength range separated by the first light separating element.

70. A device as recited in claim 68, wherein the second material is the same as the first material.

71. An optical device, comprising:
a polarizing beamsplitter, a first path being defined through the polarizing beamsplitter for light in a first polarization state, the polarizing beamsplitter including a multilayer, polarization sensitive reflective film having a relatively low refractive index and covers on either side of the polarization sensitive reflective film having a relatively high refractive index;
at least one imager disposed to reflect light back to the polarizing beamsplitter, portions of light received by the at least one imager being polarization rotated, polarization rotated light propagating along a second path from the imager and through the polarizing beamsplitter; and
a color separating element for separating the light into at least two color bands and an x-cube combining light in the at least two color bands, at least a respective reflective polarizing beamsplitter and a respective imager disposed between the color separating element and the x-cube combiner for each of the at least two color bands, the x-cube combiner including astigmatism-reducing slabs of material having a refractive index different from a refractive index of x-cube prisms forming the x-cube.

72. A device as recited in claim 71, wherein the astigmatism-reducing slabs are formed of material having a refractive index lower than the refractive index of the x-cube prisms.

73. A device as recited in claim 71, further comprising a light source to generate the light and light conditioning optics to condition the light before reaching the polarizing beamsplitter.

74. A device as recited in claim 71, further comprising a projection lens system to project image light from the at least one imager.

75. A device as recited in claim 74, wherein the astigmatism reducing slabs reduce the astigmatism to a value less than a depth of field of the projection lens system.

76. A device as recited in claim 71, further comprising a controller coupled to the at least one imager to control an image imposed on the light incident on the at least one imager.

77. A device as recited in claim 71, wherein the polarizing beamsplitter is a Cartesian polarizing beamsplitter having a structural orientation defining fixed axes of polarization and further comprising imager illumination optics having an f-number equal to or less than 2.5, the device having a dynamic range of at least 100 to 1 over projected color bands in the visible light range.

78. A device as recited in claim 71, wherein the multilayer, polarization sensitive reflective film lies in an x-y plane and has a thickness in a z-direction, and the film has a z-refractive index substantially matched to one of the x-and y-refractive indices.

79. A device as recited in claim 78, wherein a rotation axis of the first film relative to the second path is perpendicular to a rotation axis of a polarization sensitive reflection film in the polarizing beamsplitter.

80. A device as recited in claim 79, wherein the first film is a multilayer, polarization sensitive, reflective film.

81. A device as recited in claim 78, further comprising a light source to generate the light and light conditioning optics to condition the light before reaching the polarizing beamsplitter.

82. A device as recited in claim 78, further comprising a projection lens system to project image light from the at least one imager.

83. A device as recited in claim 82, wherein the first film reduces the astigmatism to a value less than a depth of field of the projection lens system.

84. A device as recited in claim 78, further comprising a controller coupled to the at least one imager to control an image imposed on the light incident on the at least one imager.

85. A device as recited in claim 78, wherein the polarizing beamsplitter is a Cartesian polarizing beamsplitter having a structural orientation defining fixed axes of polarization and further comprising imager illumination optics having an f-number equal to or less than 2.5, the device having a dynamic range of at least 100 to 1 over projected color bands in the visible light range.

86. A device as recited in claim 78, wherein the multilayer, polarization sensitive reflective film lies in an x-y plane and has a thickness in a z-direction, and the film has a z-refractive index substantially matched to one of the x-and y-refractive indices.

87. An optical device, comprising:
a polarizing beamsplitter, a first path being defined through the polarizing beamsplitter for light in a first polarization state, the polarizing beamsplitter including a multilayer, polarization sensitive reflective film having a relatively low refractive index and covers on either side of the polarization sensitive reflective film having a relatively high refractive index;
at least one imager disposed to reflect light back to the polarizing beamsplitter, portions of light received by the at least one imager being polarization rotated, polarization rotated light propagating along a second path from the imager and through the polarizing beamsplitter; and
a first film on the second path, the first film being disposed between first and second covers, the first and second covers having a refractive index higher than a refractive index of the first film, the first film reducing astigmatism in the polarization rotated light caused by the polarizing beamsplitter.

88. A projection system, comprising:
a light source to generate light;
conditioning optics to condition the light from the light source;
an imaging core to impose an image on conditioned light from the conditioning optics to form image light, the imaging core including a polarizing beamsplitter and at least one imager, the polarizing beamsplitter including a multilayer, polarization sensitive reflective film having a relatively low refractive index and covers on either side of the polarization sensitive reflective film having a relatively high refractive index, and the astigmatism arises at least partly in the polarizing beamsplitter, the polarizing beamsplitter comprising a wedge disposed between the multilayer, polarization sensitive reflective film and one of the covers, the wedge having a refractive index less than the refractive index of the covers to reduce the astigmatism; and
a projection lens system to project the astigmatism-reduced image light from the imaging core.

89. A projection system, comprising:
a light source to generate light;
conditioning optics to condition the light from the light source;
an imaging core to impose an image on conditioned light from the conditioning optics to form image light, the imaging core including a polarizing beamsplitter and at least one imager, the polarizing beamsplitter including a multilayer, polarization sensitive reflective film having a relatively low refractive index and covers on either side of the polarization sensitive reflective film having a relatively high refractive index, and the astigmatism arises at least partly in the polarizing beamsplitter, the polarizing beamsplitter includes a plate disposed between the multilayer, polarization sensitive reflective film and one of the covers, the plate having a refractive index higher than the refractive index of the covers to reduce the astigmatism; and
a projection lens system to project the astigmatism-reduced image light from the imaging core.

90. A projection system, comprising:
a light source to generate light;
conditioning optics to condition the light from the light source;
an imaging core to impose an image on conditioned light from the conditioning optics to form image light, the imaging core including a polarizing beamsplitter and at least one imager, the polarizing beamsplitter including a multilayer, polarization sensitive reflective film having a relatively low refractive index and covers on either side of the polarization sensitive reflective film having a relatively high refractive index, and the astigmatism arises at least partly in the polarizing beamsplitter;
a projection lens system to project image light from the imaging core; and
an astigmatism-reducing cube disposed between the polarizing beamsplitter and the projection lens system, the astigmatism-reducing cube including a layer having a layer refractive index disposed between covers having a cover refractive index different from the layer refractive index, the layer being tilted relative to a propagation direction of the image light.

91. A system as recited in claim 90, wherein the layer is a polarizing layer.

92. A projection system, comprising:
a light source to generate light;
conditioning optics to condition the light from the light source;
an imaging core to impose an image on conditioned light from the conditioning optics to form image light, the imaging core including a polarizing beamsplitter and at least one imager, the polarizing beamsplitter including a multilayer, polarization sensitive reflective film having a relatively low refractive index and covers on either side of the polarization sensitive reflective film having a relatively high refractive index, and the astigmatism arises at least partly in the polarizing beamsplitter, at least one element in the imaging core adapted to reduce astigmatism in the image light;
a color separator disposed between the polarization beamsplitter and the at least one imager, the color separator being a color separating prism having at least first and second color separating elements separated by a gap layer of material having a refractive index different from a refractive index of the first and second color separating elements, a thickness of the gap layer being selected to reduce astigmatism in the image light; and
a projection lens system to project the image light from the imaging core.

93. A system as recited in claim 92, wherein the gap layer has a refractive index lower than the refractive index of the first and second color separating elements.

94. A system as recited in claim 92, wherein the gap layer has a refractive index higher than the refractive index of the first and second color separating elements.

95. A system as recited in claim 92, wherein the first color separating element is made of two parts separated by a second gap layer having a refractive index different from the refractive index of the first color separating element, and having a thickness selected to reduce astigmatism in the image light.

96. A system as recited in claim 95, wherein the second gap layer has a refractive index lower than the refractive index of the first color separating element.

97. A system as recited in claim 95, wherein the second gap layer has a refractive index higher than the refractive index of the first color separating element.

98. A system as recited in claim 92, further comprising a wedge prism disposed between the color separating prism and the polarizing beamsplitter, a third gap layer between the wedge prism and the color separating prism, having a refractive index different from wedge prism, having a thickness selected to reduce astigmatism.

99. A system as recited in claim 92, wherein the color separating prism separates light into different colors in a plane approximately perpendicular to a reflection plane of the polarizing beamsplitter.

100. A system as recited in claim 92, wherein the color separating prism separates light into different colors in a plane approximately parallel to a reflection plane of the polarizing beamsplitter.

101. A projection system, comprising:

a light source to generate light;

conditioning optics to condition the light from the light source;

an imaging core to impose an image on conditioned light from the conditioning optics to form image light, the imaging core including a polarizing beamsplitter and at least two imagers, the polarizing beamsplitter including a multilayer, polarization sensitive reflective film having a relatively low refractive index and covers on either side of the polarization sensitive reflective film having a relatively high refractive index, and the astigmatism arises at least partly in the polarizing beamsplitter, and an x-cube to combine light from the at least two imagers in at least two color bands, the x-cube combiner including astigmatism-reducing slabs of material having a refractive index different from a refractive index of x-cube prisms forming the x-cube; and a projection lens system to project the astigmatism-reduced image light from the imaging core.

102. A system as recited in claim 101, wherein the astigmatism-reducing slabs are formed of material having a refractive index lower than the refractive index of the x-cube prisms.

* * * * *